US005646198A

United States Patent [19]

Tanaka et al.

[11] Patent Number: 5,646,198
[45] Date of Patent: Jul. 8, 1997

[54] COATING COMPOSITION AND ANTIFOULING PAINT

[75] Inventors: Hiroyuki Tanaka, Mito; Seiji Tai, Hitachi; Koichi Kamijima, Hitachi; Yumiko Wada, Hitachi; Tsutomu Mamiya, Choshi; Makoto Murakami, Ibaraki-ken; Teruo Yoshida, Hitachi, all of Japan

[73] Assignee: Hitachi Chemical Company, Ltd., Tokyo, Japan

[21] Appl. No.: 360,316

[22] Filed: Dec. 21, 1994

[30] Foreign Application Priority Data

| Dec. 24, 1993 | [JP] | Japan | 5-327096 |
| Jan. 25, 1994 | [JP] | Japan | 6-006082 |
| Jan. 25, 1994 | [JP] | Japan | 6-006083 |
| Feb. 28, 1994 | [JP] | Japan | 6-029486 |
| Apr. 25, 1994 | [JP] | Japan | 6-086479 |
| Apr. 27, 1994 | [JP] | Japan | 6-089680 |
| Apr. 28, 1994 | [JP] | Japan | 6-091631 |
| May 12, 1994 | [JP] | Japan | 6-098271 |
| Jul. 21, 1994 | [JP] | Japan | 6-169542 |
| Oct. 14, 1994 | [JP] | Japan | 6-249569 |

[51] Int. Cl.$^6$ ............................ C09D 5/16; C08K 5/3467
[52] U.S. Cl. ............................ 523/122; 523/177; 524/91; 524/141; 524/318; 106/18.31; 106/18.32
[58] Field of Search ............................ 524/95, 100, 141, 524/318, 558, 91; 523/122, 177; 106/18.31, 18.32

[56] References Cited

U.S. PATENT DOCUMENTS

| 4,138,381 | 2/1979 | Chang et al. | 524/765 |
| 4,150,945 | 4/1979 | Onizawa | 525/351 |
| 4,918,147 | 4/1990 | Yamamori et al. | 523/122 |
| 5,280,072 | 1/1994 | Wamprecht et al. | 525/207 |
| 5,298,542 | 3/1994 | Nakamura et al. | 524/297 |
| 5,356,968 | 10/1994 | Rupaner et al. | 524/157 |
| 5,356,979 | 10/1994 | Tai et al. | 524/558 |

FOREIGN PATENT DOCUMENTS

| 0608132 | 7/1994 | European Pat. Off. . |
| 2435511 | 4/1980 | France . |
| 4115495 | 11/1992 | Germany . |
| 2-99567 | 5/1988 | Japan . |
| 4-180971 | 6/1992 | Japan . |
| 6-108010 | 4/1994 | Japan . |
| 2030989 | 9/1978 | United Kingdom . |
| 8402915 | 8/1984 | WIPO . |
| 86/02660 | 9/1986 | WIPO . |
| 9100321 | 1/1991 | WIPO . |

OTHER PUBLICATIONS

Database WPI, Section CH, Week 8331, Derwent Publications Ltd., London, GB.

*Primary Examiner*—Tae Yoon
*Attorney, Agent, or Firm*—Antonelli, Terry, Stout & Kraus, LLP

[57] ABSTRACT

A coating composition comprising (A) a polymer obtained by polymerizing (a1) one or more unsaturated acid anhydrides or unsaturated carboxylic acids and (a2) one or more other unsaturated monomers copolmerizable therewith, and (B) at least one compound selected from one or both of (b1) a compound group comprising amino-acids, compounds having one or more carboxyl groups in the molecule, compounds having both hydrophobic group and hydrophilic group in the molecule, chelate compounds, hydroxyl- or acetyl-substituted carboxylic acid esters, ion-exchangeable layer clay minerals and powers of inorganic materials which have been made lipophilic with an organic material, and (b2) a group of compound which is crystallizable and selected from polyether compounds, polyester compounds, polyether-polyester compounds, olefinic glycol compounds, acrylic esters, methacrylic esters and polycarbonate compounds, is useful for preparing an antifouling coating composition by mixing with a copper compound.

10 Claims, No Drawings

COATING COMPOSITION AND ANTIFOULING PAINT

BACKGROUND OF THE INVENTION

The present invention relates to a composition for coating materials and an antifouling coating composition to be used for preventing attachment of marine organisms to the underwater or submarine structures such as ships, fishing nets, drainage conduits, etc.

Numerous species of marine organism, such as barnacle, ascidian, serpula, mussel, laver, etc., live in the seawater. When a structure such as a ship, fishing net, drainage pipe, etc., is set or placed in commission in or on the sea, the marine organisms cling to the structure and grow to give various kinds of damage to the structure. For instance, if the ship's bottom is incrusted with marine organisms, the frictional resistance of the seawater increases to cause a reduction of cruising performance of the ship, so that if it is tried to keep a constant cruising speed of the ship, its fuel consumption increases to pose a serious economical problem. Also, if the marine organisms cling to the fishing net used for ocean culture, the meshes of the nets would be clogged up, which could prove fatal to the cultured fishes and shellfishes.

Hitherto, in order to prevent attachment of the marine organisms to the underwater structures such as mentioned above, antifouling paints using homopolymers or copolymers of organotin-containing unsaturated monomers as resinous component (see Japanese Patent Examined Publication (JP-B) Nos. 40-21426, 44-9579, 46-13392, 49-20491, 51-11647, 51-12049, 52-48170, etc.) have been applied to said structures. These polymers have their organotin portion hydrolyzed with the seawater (pH: 8.0–8.3). As a result, not only the organotin serves as an antifouling agent, but also the polymer surface which has been made soluble in seawater is gradually eroded by the moving seawater to bare out the new coating surface, thus producing a long-lasting stabilized antifouling effect. However, the organotin released into the seawater from the paints is hard to decompose and may be taken in by and accumulated in marine organisms and, through the food chain, it may get into the human system. This involves the possibility of causing serious physical trouble such as deformity. So, use of the dangerous organotin compounds has been restricted.

Request is now voiced in the art for the development of a resin for antifouling paints which are capable of producing a long-lasting stabilized antifouling effect, in place of the highly dangerous organotin-based resins. Ideally speaking, it is desirable that the resins used for antifouling paints are of a hydrolyzable type like the organotin-based resins and have ability to form coating eroded gradually during usage in the seawater, but proposals involving use of hydrophilic or water-repellent resins have also been made (Japanese Patent Unexamined Publication (JP-A) Nos. 62-290768, 62-13471, 58-180565, 57-67672, etc.). However, it is hardly possible to realize a long-lasting stabilized antifouling effect by use of a resin having the hydrophilic or water-repellent properly alone.

In view of the above, various hydrolyzable resins having a specific carboxylic acid ester in the side chain have been proposed (WO 84/02915, JP-A Nos. H2-69576, 63-215780, 62-57464, JP-B Nos. 55-39271, 61-3830, etc.), but their effect has not been well satisfactory.

On the other hand, JP-A No. 2-99567 proposes to use copolymers of maleic anhydride derivatives while JP-A Nos. 51-124130, 62-135575 and 62-501293 propose use of copolymers of the derivatives having free carboxyl groups for said purpose. These copolymers have no toxicity unlike the organotin-based resins and are expected to have excellent ability to form coating eroded gradually during usage in the seawater.

However, these copolymers, when used in anti-fouling paints, had fatal defects in that as they are mixed with a copper compound which is treated currently as a toxicant, the paint could cause thickening-gelation during storage, and that the ability to form coating eroded gradually during usage in the seawater is poor.

SUMMARY OF THE INVENTION

It is an object of the present invention to provide a composition for coating materials and an antifouling coating composition, which have no danger as the organotin copolymers but have good ability to form coating eroded gradually during usage in the seawater equal to the organotin copolymers, are able to form a coating capable of maintaining excellent anti-fouling properties for a long period of time and also have excellent storage stability with no gelation caused even if kneaded with a copper compound.

The present inventors have pursued extensive studies with the object of solving said problems and developing an antifouling paint having the property to prevent attachment of said marine organisms and having no danger in use, and as a result, completed the present invention.

The present invention provides a coating composition comprising (A) a polymer obtained by polymerizing (a1) one or more unsaturated acid anhydrides or unsaturated carboxylic acids and (a2) one or more other unsaturated monomers copolymerizable with the component (a1), and (B) at least one compound selected from one or both of (b1) a compound group comprising amino acids, compounds having one or more carboxyl groups in the molecule, compounds having both hydrophobic and hydrophilic groups in the molecule, chelate compounds, hydroxyl- or acetyl-substituted carboxylic acid esters, ion-exchangeable layer clay minerals and pulverized inorganic materials which have been made lipophilic with an organic material, and (b2) a group of compound which is crystallizable and selected from polyether compounds, polyester compounds, polyether-polyester compounds, olefinic glycol compounds, acrylic esters, methacrylic esters and polycarbonate compounds.

The present invention also provides an antifouling coating composition comprising a coating composition mentioned above and an antifouling agent containing a copper compound as a major component.

DESCRIPTION OF THE PREFERRED EMBODIMENTS

Polymer (A) used in the present invention is described first.

Of the unsaturated acid anhydrides or unsaturated carboxylic acids (a1) usable for the preparation of polymer (A), the unsaturated acid anhydrides include maleic anhydride, methylmaleic anhydride, dimethylmaleic anhydride, ethylmaleic anhydride, diethylmaleic anhydride, chloromaleic anhydride, dichloromaleic anhydride, bromomaleic anhydride, dibromomaleic anhydride, 1-methylitaconic anhydride, 1,2-dimethyl itaconic anhydride, 1-phenylmaleic anhydride, citraconic anhydride, cyclopentenedicarboxylic acid anhydride, chlorocyclopentenedicarboxylic acid anhydride, nitrocyclopentenedicarboxylic acid anhydride, methylcyclopentenedicarboxylic acid anhydride, ethylcyclopentenedicarboxylic acid anhydride, dimethylcyclopentenedicarboxylic acid anhydride, diethylcyclopentenedicarboxylic acid anhydride, cyclohexenedicarboxylic acid anhydride, chlorocyclohexenedicarboxylic acid anhydride, nitrocyclohexenedicarboxylic acid anhydride, methylcyclohexenedicarboxylic acid anhydride, ethylcyclohexenedicarboxylic acid anhydride, dimethylcyclohexenedicarboxylic acid anhydride, diethylcyclohexenedicarboxylic acid anhydride, cycloheptenedicarboxylic acid anhydride, bicyclo[2,2,1]heptenedicarboxylic acid anhydride, bicyclo[2,2,2]octenedicarboxylic acid anhydride, hexachlorobicyclo[2,2,1]heptenedicarboxylic acid anhydride, and 7-oxabicyclo[2,2,1]heptenedicarboxylic acid anhydride. Among them, meleic anhydride, methylmaleic anhydride, dimethylmaleic anhydride, ethylmaleic anhydride, diethylmaleic anhydride, chloromaleic anhydride, dichloromaleic anhydride, bromomaleic anhydride, dibromomaleic anhydride, 1-methylitaconic anhydride, 1,2-dimethylitaconic anhydride, 1-phenylitaconic anhydride and citraconic anhydride are preferred. These unsaturated acid anhydrides may be used either singly or as a mixture thereof.

When an unsaturated acid anhydride is used in the present invention, its amount used is preferably selected from between 1 and 50% by mole, more preferably 10 and 40% by mole, based on the total amount of the monomers. When the amount is less than 1% by mole, it becomes difficult to obtain the resin showing sufficient ability to form coating eroded gradually during usage in the seawater. When the amount is more than 50% by mole, there tends to remain the unreacted unsaturated acid anhydride to give undesirable influences on paint film stability.

The unsaturated carboxylic acids usable in this invention are those having free carboxyl groups. Examples of such unsaturated carboxylic acids include acrylic acid, methacrylic acid, crotonic acid, cinnamic acid, maleic acid, fumalic acid, itaconic acid, citraconic acid and the like. Monoesters of dicarboxylic acids are also usable. Among them, acrylic acid and methacrylic acid are preferred for high effect. These unsaturated carboxylic acids may be used singly or as a mixture thereof.

In case an unsaturated carboxylic acid is used in the present invention, its amount used is preferably selected from between 1 and 99% by mole, preferably 10 and 95% by mole, based on the total amount of the monomers. When the amount is less than 1% by mole, it is difficult to obtain the resin showing sufficient ability to form coating eroded gradually during usage in the seawater, and when the amount exceeds 99% by mole, there is a tendency to give undesirable influences on paint film stability.

It is possible to jointly use an unsaturated acid anhydride and an unsaturated carboxylic acid.

The other unsaturated monomer (a2) copolymerizable with the unsaturated acid anhydride or unsaturated carboxylic acid (a1) used in the present invention may be selected from various monomers. As such an unsaturated monomer (a2), it is preferable to use those including an unsaturated monomer represented by the formula:

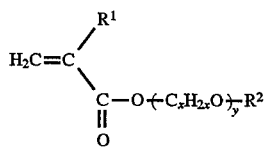 (I)

wherein $R^1$ is a hydrogen atom or a methyl group; x is an integer of 1 to 6; y is an integer of 1 to 100; and $R^2$ is a hydrogen atom, a straight, branched or cyclic alkyl group preferably having 1 to 10 carbon atoms, aryl group preferably having 6 to 10 carbon atoms or aralkyl group preferably having 7 to 10 carbon atoms, provided that when an unsaturated acid anhydride is used as the component (a1) of the polymer (A), $R^2$ is not a hydrogen atom, because of further improvement of the composition properties such as hydrolyzable properties.

Examples of the straight, branched or cyclic alkyl groups, aryl groups and aralkyl groups represented by $R^2$ in the formula (I) include methyl, ethyl, propyl, isopropyl, butyl, isobutyl, sec-butyl, tert-butyl, pentyl, sec-pentyl, tert-pentyl, neopentyl, 2-ethylhexyl, cyclopropyl, cyclobutyl, cyclopentyl, cyclohexyl, phenyl, o-tolyl, m-tolyl, p-tolyl, 2,3-xylyl, 2,4-xylyl, o-cumenyl, m-cumenyl, p-cumenyl, mesityl, benzyl, phenetyl, naphthyl, and norbornyl.

The unsaturated monomers of the formula (I) can be produced by conventional processes. It is possible to use commercially available unsaturated monomers.

Listed below are the preferred examples of the unsaturated monomers of the formula (I). Illustrated Compound No.

(1) $CH_2=C(R)CO_2CH_2CH_2OCH_3$
(2) $CH_2=C(R)CO_2(CH_2CH_2O)_2CH_3$
(3) $CH_2=C(R)CO_2(CH_2CH_2O)_3CH_3$
(4) $CH_2=C(R)CO_2(CH_2CH_2O)_4CH_3$
(5) $CH_2=C(R)CO_2(CH_2CH_2O)_5CH_3$
(6) $CH_2=C(R)CO_2(CH_2CH_2O)_6CH_3$
(7) $CH_2=C(R)CO_2(CH_2CH_2O)_7CH_3$
(8) $CH_2=C(R)CO_2(CH_2CH_2O)_8CH_3$
(9) $CH_2=C(R)CO_2(CH_2CH_2O)_9CH_3$
(10) $CH_2=C(R)CO_2(CH_2CH_2O)_{10}CH_3$
(11) $CH_2=C(R)CO_2(CH_2CH_2O)_{12}CH_3$
(12) $CH_2=C(R)CO_2(CH_2CH_2O)_{14}CH_3$
(13) $CH_2=C(R)CO_2(CH_2CH_2O)_{16}CH_3$
(14) $CH_2=C(R)CO_2(CH_2CH_2O)_{18}CH_3$
(15) $CH_2=C(R)CO_2(CH_2CH_2O)_{20}CH_3$
(16) $CH_2=C(R)CO_2(C_3H_6O)CH_3$
(17) $CH_2=C(R)CO_2(C_3H_6O)_2CH_3$
(18) $CH_2=C(R)CO_2(C_3H_6O)_4CH_3$
(19) $CH_2=C(R)CO_2(C_3H_6O)_6CH_3$
(20) $CH_2=C(R)CO_2(C_3H_6O)_8CH_3$
(21) $CH_2=C(R)CO_2(C_3H_6O)_{10}CH_3$
(22) $CH_2=C(R)CO_2(C_4H_8O)CH_3$
(23) $CH_2=C(R)CO_2(C_4H_8O)_2CH_3$
(24) $CH_2=C(R)CO_2(CH_2CH_2O)_2C_6H_{11}$
(25) $CH_2=C(R)CO_2(CH_2CH_2O)_2C_6H_5$
(26) $CH_2=C(R)CO_2CH_2OH$
(27) $CH_2=C(R)CO_2CH_2CH_2OH$
(28) $CH_2=C(R)CO_2C_3H_6OH$
(29) $CH_2=C(R)CO_2C_4H_6OH$
(30) $CH_2=C(R)CO_2C_5H_{10}OH$
(31) $CH_2=C(R)CO_2C_6H_{12}OH$
(32) $CH_2=C(R)CO_2(C_5H_{10}O)_3H$
(33) $CH_2=C(R)CO_2(C_5H_{10}O)_4H$
(34) $CH_2=C(R)CO_2(C_5H_{10}O)_5H$
(35) $CH_2=C(R)CO_2(C_5H_{10}O)_6H$
(36) $CH_2=C(R)CO_2(C_6H_{12}O)_2H$
(37) $CH_2=C(R)CO_2(C_6H_{12}O)_3H$
(38) $CH_2=C(R)CO_2(C_6H_{12}O)_4H$
(39) $CH_2=C(R)CO_2(C_6H_{12}O)_5H$
(40) $CH_2=C(R)CO_2(C_6H_{12}O)_6H$
(41) $CH_2=C(R)CO_2CH_2CH_2OC_2H_5$
(42) $CH_2=C(R)CO_2(CH_2CH_2O)_2C_2H_5$
(43) $CH_2=C(R)CO_2(CH_2CH_2O)_3C_2H_5$
(44) $CH_2=C(R)CO_2(CH_2CH_2O)_4C_2H_5$
(45) $CH_2=C(R)CO_2(CH_2CH_2O)_5C_2H_5$
(46) $CH_2=C(R)CO_2(CH_2CH_2O)_6C_2H_5$
(47) $CH_2=C(R)CO_2(CH_2CH_2O)_7C_2H_5$

(48) $CH_2=C(R)CO_2(CH_2CH_2O)_8C_2H_5$
(49) $CH_2=C(R)CO_2(CH_2CH_2O)_9C_2H_5$
(50) $CH_2=C(R)CO_2(CH_2CH_2O)_{10}C_2H_5$
(51) $CH_2=C(R)CO_2(CH_2CH_2O)_{12}C_2H_5$
(52) $CH_2=C(R)CO_2(CH_2CH_2O)_{14}C_2H_5$
(53) $CH_2=C(R)CO_2(CH_2CH_2O)_{16}C_2H_5$
(54) $CH_2=C(R)CO_2(CH_2CH_2O)_{18}C_2H_5$
(55) $CH_2=C(R)CO_2(CH_2CH_2O)_{20}C_2H_5$
(56) $CH_2=C(R)CO_2(C_3H_6O)C_2H_5$
(57) $CH_2=C(R)CO_2(C_3H_6O)_2C_2H_5$
(58) $CH_2=C(R)CO_2(C_3H_6O)_4C_2H_5$
(59) $CH_2=C(R)CO_2(C_3H_6O)_6C_2H_5$
(60) $CH_2=C(R)CO_2(C_3H_6O)_8C_2H_5$
(61) $CH_2=C(R)CO_2(C_3H_6O)_{10}C_2H_5$
(62) $CH_2=C(R)CO_2(C_4H_8O)C_2H_5$
(63) $CH_2=C(R)CO_2(C_4H_{80})_2C_2H_5$
(64) $CH_2=C(R)CO_2(C_4H_{80})_3C_2H_5$
(65) $CH_2=C(R)CO_2(CH_2O)_4C_2H_5$
(66) $CH_2=C(R)CO_2CH_2CH_2OC_3H_7$
(67) $CH_2=C(R)CO_2(CH_2CH_2O)_2C_3H_7$
(68) $CH_2=C(R)CO_2(CH_2CH_2O)_3C_3H_7$
(69) $CH_2=C(R)CO_2(CH_2CH_2O)_4C_3H_7$
(70) $CH_2=C(R)CO_2(CH_2CH_2O)_5C_3H_7$
(71) $CH_2=C(R)CO_2(CH_2CH_2O)_6C_3H_7$
(72) $CH_2=C(R)CO_2(CH_2CH_2O)_7C_3H_7$
(73) $CH_2=C(R)CO_2(CH_2CH_2O)_8C_3H_7$
(74) $CH_2=C(R)CO_2(CH_2CH_2O)_9C_3H_7$
(75) $CH_2=C(R)CO_2(CH_2CH_2O)_{10}C_3H_7$
(76) $CH_2=C(R)CO_2(CH_2CH_2O)_{12}C_3H_7$
(77) $CH_2=C(R)CO_2(CH_2CH_2O)_{14}C_3H_7$
(78) $CH_2=C(R)CO_2(CH_2CH_2O)_{16}C_3H_7$
(79) $CH_2=C(R)CO_2(CH_2CH_2O)_{18}C_3H_7$
(80) $CH_2=C(R)CO_2(CH_2CH_2O)_{20}C_3H_7$
(81) $CH_2=C(R)CO_2(C_3H_6O)C_3H_7$
(82) $CH_2=C(R)CO_2(C_3H_6O)_2C_3H_7$
(83) $CH_2=C(R)CO_2(C_3H_6O)_4C_3H_7$
(84) $CH_2=C(R)CO_2(C_3H_6O)_6C_3H_7$
(85) $CH_2=C(R)CO_2(C_3H_6O)_8C_3H_7$
(86) $CH_2=C(R)CO_2(C_3H_6O)_{10}C_3H_7$
(87) $CH_2=C(R)CO_2(C_4H_8O)C_3H_7$
(88) $CH_2=C(R)CO_2(C_4H_8O)_2C_3H_7$
(89) $CH_2=C(R)CO_2(C_4H_8O)_3C_3H_7$
(90) $CH_2=C(R)CO_2(C_4H_8O)_4C_3H_7$
(91) $CH_2=C(R)CO_2CH_2CH_2OC_4H_9$
(92) $CH_2=C(R)CO_2(CH_2CH_2O)_2C_4H_9$
(93) $CH_2=C(R)CO_2(CH_2CH_2O)_3C_4H_9$
(94) $CH_2=C(R)CO_2(CH_2CH_2O)_4C_4H_9$
(95) $CH_2=C(R)CO_2(CH_2CH_2O)_5C_4H_9$
(96) $CH_2=C(R)CO_2(CH_2CH_2O)_6C_4H_9$
(97) $CH_2=C(R)CO_2(CH_2CH_2O)_7C_4H_9$
(98) $CH_2=C(R)CO_2(CH_2CH_2O)_8C_4H_9$
(99) $CH_2=C(R)CO_2(CH_2CH_2O)_9C_4H_9$
(100) $CH_2=C(R)CO_2(CH_2CH_2O)_{10}C_4H_9$
(101) $CH_2=C(R)CO_2(CH_2CH_2O)_{12}C_4H_9$
(102) $CH_2=C(R)CO_2(CH_2CH_2O)_{14}C_4H_9$
(103) $CH_2=C(R)CO_2(CH_2CH_2O)_{16}C_4H_9$
(104) $CH_2=C(R)CO_2(CH_2CH_2O)_{18}C_4H_9$
(105) $CH_2=C(R)CO_2(CH_2CH_2O)_{20}C_4H_9$
(106) $CH_2=C(R)CO_2(C_3H_6O)C_4H_9$
(107) $CH_2=C(R)CO_2(C_3H_6O)_2C_4H_9$
(108) $CH_2=C(R)CO_2(C_3H_6O)_4C_4H_9$
(109) $CH_2=C(R)CO_2(C_3H_6O)_6C_4H_9$
(110) $CH_2=C(R)CO_2(C_3H_6O)_8C_4H_9$
(111) $CH_2=C(R)CO_2(C_3H_6O)_{10}C_4H_9$
(112) $CH_2=C(R)CO_2(C_4H_8O)C_4H_9$
(113) $CH_2=C(R)CO_2(C_4H_8O)_2C_4H_9$
(114) $CH_2=C(R)CO_2(C_4H_8O)_3C_4H_9$
(115) $CH_2=C(R)CO_2(C_4H_8O)_4C_4H_9$
(116) $CH_2=C(R)CO_2(CH_2CH_2O)_2H$
(117) $CH_2=C(R)CO_2(CH_2CH_2O)_3H$
(118) $CH_2=C(R)CO_2(CH_2CH_2O)_4H$
(119) $CH_2=C(R)CO_2(CH_2CH_2O)_5H$
(120) $CH_2=C(R)CO_2(CH_2CH_2O)_6H$
(121) $CH_2=C(R)CO_2(CH_2CH_2O)_7H$
(122) $CH_2=C(R)CO_2(CH_2CH_2O)_8H$
(123) $CH_2=C(R)CO_2(CH_2CH_2O)_9H$
(124) $CH_2=C(R)CO_2(CH_2CH_2O)_{10}H$
(125) $CH_2=C(R)CO_2(CH_2CH_{20})_{12}H$
(126) $CH_2=C(R)CO_2(CH_2CH_2O)_{14}H$
(127) $CH_2=C(R)CO_2(CH_2CH_2O)_{16}H$
(128) $CH_2=C(R)CO_2(CH_2CH_2O)_{18}H$
(129) $CH_2=C(R)CO_2(CH_2CH_2O)_{20}H$
(130) $CH_2=C(R)CO_2(C_3H_6O)H$
(131) $CH_2=C(R)CO_2(C_3H_6O)_2H$
(132) $CH_2=C(R)CO_2(C_3H_6O)_4H$
(133) $CH_2=C(R)CO_2(C_3H_6O)_6H$
(134) $CH_2=C(R)CO_2(C_3H_6O)_8H$
(135) $CH_2=C(R)CO_2(C_3H_6O)_{10}H$
(136) $CH_2=C(R)CO_2(C_4H_8O)H$
(137) $CH_2=C(R)CO_2(C_4H_8O)_2H$
(138) $CH_2=C(R)CO_2(C_4H_8O)_3H$
(139) $CH_2=C(R)CO_2(C_4H_8O)_4H$

In the above formulae, R represents a hydrogen atom or a methyl group.

The unsaturated monomer of the formula (I) is preferably used in an amount of 0.1 to 20% by mole, more preferably 0.5 to 15% by mole, based on the total amount of the monomers. When the amount is less than 0.1% by mole, the effect of addition barely appears, and when the amount is more than 20% by mole, there is a tendency to lower paint film stability.

The unsaturated monomers of the formula (I) can be used singly or as a mixture thereof.

As the unsaturated monomers (a2) other than those of the formula (I), there can be used, for example, acrylic or methacrylic acid ester type monomers such as methyl ester, ethyl ester, n-propl ester, isopropyl ester, n-butyl ester, isobutyl ester, sec-butyl ester, tert-butyl ester, 2-ethylhexyl ester, octyl ester, nonyl ester, decyl ester, undecyl ester, dodecyl ester, tridecyl ester, tetradecyl ester, pentadecyl ester, hexadecyl ester, heptadecyl ester, octadecyl ester, nonadecyl ester, eicosyl ester, heneicosyl ester, docosyl ester, cyclohexyl ester, benzyl ester, phenyl-ester, dimethylaminoethyl ester, dimethylaminopropyl ester, 2-chloroethyl ester, 2,2,2-trichloroethyl ester, 2-fluoroethylester, 2,2,2-trifluoroethyl ester, 2-cyanoethyl ester, trimethylsilyl ester, triethylsilyl ester, tripropylsilyl ester, tributylsilyl ester, trihexylsilyl ester, trimethoxysilylester, triethoxysilyl ester, tripropoxysilyl ester, tributoxysilyl ester, trihexylsilyl ester, triphenylsilyl ester and triphenoxysilyl ester of acrylic or methacrylic acid; styrene and styrene type monomers such as α-methyl-styrene and p-t-butylstyrene; polyolefinic monomers such as butadiene, isoprene and chloroprene; vinyl monomers such as vinyl chloride and vinyl acetate; and nitrile monomers such as acrylonitrile and metacrylonitrile. Among them, methyl ester, ethyl ester, n-propyl ester, isopropyl ester, n-butyl ester, isobutyl ester, sec-butyl ester, tert-butyl ester, 2-ethylhexyl ester, dodecylester, cyclohexyl ester and benzyl ester of acrylic or methacrylic and styrene are preferred. The above unsaturated monomers (a2) other than those of the formula (I) may be used singly or as a mixture thereof.

The unsaturated monomer (a2) other than those of the formula (I) is preferably used in an amount of 30 to 90% by mole based on the total amount of the monomers. When the amount is less than 30% by mole, there is a tendency to lower water resistance of the resin, and when the amount is more than 90% by mole, there is a tendency to lower the ability to form coating eroded gradually during usage in the seawater. The unsaturated monomers (a2) of the formula (I) and the unsaturated monomers (a2) other than those of the formula (I) may be used as a mixture thereof.

The amount of the unsaturated monomer (a2) including the unsaturated monomer of the formula (I) is preferably 1 to 99% by mole based on the total amount of the monomers in view of paint film stability and ability to form coating eroded gradually during usage in the seawater. In case of using an unsaturated acid anhydride as the unsaturated monomer (a1), its amount used is preferably 50 to 99% by mole, more preferably 70 to 85% by mole, for the same reason. Further, when the monomer (a1) is a carboxylic acid, it is preferable to use 50–80% by weight of the monomer (a2).

For the preparation of the polymer (A), there can be used any suitable polymerization method which is per se known in the art, but usually the preparation process differs depending on whether the unsaturated monomer (a1) used is an unsaturated acid anhydride or an unsaturated carboxylic acid.

In case (a1) is an unsaturated acid anhydride, polymerization is preferably carried out by a process in which a solution containing other monomer (a2) and a radical polymerization catalyst is added dropwise into a solvent solution of (a1). The reaction temperature is usually 0° to 180° C., preferably about 40° to 170° C. The time for dropwise addition is usually 1 to 10 hours, preferably 2 to 6 hours. The organic solvent used for polymerization is preferably one having no reactivity with the unsaturated acid anhydride used and low in hydrophilicity. An aromatic solvent such as xylene or toluene is especially preferred.

In case (a1) is an unsaturated carboxylic acid, a process can be employed in which a solution containing an unsaturated carboxylic acid, other monomer (a2) and a radical polymerization catalyst is added dropwise into a solvent. The reaction temperature is usually 0° to 180° C., preferably about 40° to 170° C. The time for dropwise addition is usually 1 to 10 hours, preferably 2 to 6 hours. As the solvent, there can be used any organic solvent having no reactivity with the unsaturated carboxylic acid used and capable of dissolving the copolymer produced, and this type of solvents can be used either singly or as a mixture thereof. Examples of such organic solvents are alcohols such as methanol, ethanol, propanol, isopropanol, butanol, isobutanol and benzyl alcohol; polyalkylene glycols such as methyl Cellosolve, ethyl Cellosolve, ethylene glycol dimethyl ether and ethylene glycol monoacetate; aromatic hydrocarbons such as toluene and xylene; esters such as ethyl acetate and butyl acetate; ketones such as cyclohexanone and methyl isobutyl ketone; and halogen-containing solvents such as carbon tetrachloride and trichloroethane. Water which is free of the problem of environmental pollution is also usable as solvent.

The resins having carboxyl groups are hard to use as paint base in an aromatic hydrocarbon solvent with low polarity such as toluene or xylene, due to too high viscosity. Therefore, in order to reduce the viscosity of said resins so as to make them usable as paint base, it is necessary to use a large amount of solvent for dilution, so that the obtained varnish is one having a very low solid resin content. In order to solve this problem, it is recommended to use a solvent having a surfactant-like function such as alcohols, polyalkylene glycols and water, or a mixture thereof with other solvent(s). The amount of the solvent used is not specified no matter whether (a1) is an unsaturated acid anhydride or an unsaturated carboxylic acid, but usually it is about ½ to 2 in terms of mass ratio to the total amount of the monomers.

As the radical polymerization catalyst, there can be used azo compounds, peroxide compounds and the like which are usually used as radical polymerization initiator. Examples of such radical polymerization catalysts are 2,2'-azobis(4-methoxy-2,4-dimethyl-valeronitrile), 2,2'-azobis (cyclopropylpropionitrile), 2,2'-azobis(2,4-dimethylvaleronitrile), 2,2'-azobis-(isobutylonitrile), 2,2'-azobis(2-methylbutylonitrile), 1,1'-azobis(cyclohexane-1-carbonitrile), 2-phenylazo-4-methoxy-2,4-dimethylvaleronitrile, benzoyl peroxide, and di-tert-butyl peroxybenzoate. The amount of the initiator used may vary, but it is preferably 0.1 to 5% by weight, more preferably 0.2 to 4% by weight, based on the total amount of the monomers. The number-average molecular weight of the obtained polymer is not limited, but it is preferably 3,000 to 200,000, more preferably 5,000 to 50,000, in view of the properties of the coating resin. The number-average molecular weight shown in the present invention is a value obtained by measurement according to gel permeation chromatography, followed by calculation using a standard polystyrene calibration curve.

An appropriate chain transfer agent may be added during polymerization for the purpose of adjusting the molecular weight. Examples of the chain transfer agents usable in this invention include methanethiol, ethanethiol, n-propanethiol, isopropanethiol, n-butanethiol, 2-methylpropanethiol, 3-methylpropanethiol, 1,1-dimethylethanethiol, 1-hexanethiol, 1-octanethiol, 1-decanethiol, benzenethiol, 2-methylbenzenethiol, 3-methylbenzenethiol, 4-methylbenzenethiol, 2-ethyl-benzenethiol, 3-ethylbenzenethiol, 4-ethylbenzenethiol, bis(4-hydroxydimethylphenyl)disulfide, bis(2-chloromethylphenyl)disulfide, bis(2-bromomethylphenyl)-disulfide, dinaphthyldisulfide, di-2-benzothiadisulfide, α-methylstyrene dimer, carbon tetrachloride, carbon tetrabromide, and chloroform. The amount of the chain transfer agent used can be properly selected depending on the molecular weight of the objective polymer. The polymerization is carried out in an inert gas atmosphere. As the inert gas, there can be used nitrogen, argon, helium, neon and the like.

Now, the compound (B) added to the solution of said polymer (A) in the present invention is described. In the present invention, the compound (B) is added for the purpose of improving the long-lasting ability to form coating eroded gradually during usage in the seawater of the paint. The compound (B) is selected from those having no reactivity with the polymer (A) obtained by polymerizing at least one unsaturated acid anhydride or unsaturated carboxylic acid (a1) and at least one other unsaturated monomer (a2) copolymerizable therewith.

Specifically, the compound (B) is selected from one or both of (b1) the compound group consisting of amino acids, compounds having one or more carboxyl groups in the molecule, compounds having both hydrophobic and hydrophilic groups in the molecule, chelate compounds, hydroxy- or acetyl-substituted carboxylic acid esters, ion-exchangeable layer clay minerals and pulverized inorganic materials which have been made lipophilic with an organic material, and (b2) the crystalline compound group consisting of polyether compounds, polyester compounds, polyether-polyester compounds, olefinic glycol compounds, acrylic esters, methacrylic esters and polycarbonate compounds. The amount of the compound (B) used, although variable depending on the type of the compound (B) used, is preferably 0.01 to 200% by weight based on the polymer (A). When the amount is less than 0.01% by weight, the effect of addition of this compound is insufficient and the long-lasting ability to form coating eroded gradually during usage in the seawater of the composition tends to deteriorate. When the amount exceeds 200% by weight, the durability of the coating in the seawater tends to lower.

Examples of the amino acids usable as compound (B) include azaserine, L-asparagine, L-aspartic acid, L-α-aminolactic acid, L-alanine, β-alanine, L-alginine, L-alloisoleucine, L-allothreonine, L-isoleucine, L-ethionine, ergothioneine, L-ornithine, L-canavanine, L-carboxymethylcysteine, L-kynurenine, glycine, L-glutamine, L-glutamic acid, creatine, sarcosine, L-cystathionine, L-cystine, L-cysteine, L-cysteic acid, L-citrulline, L-β-(3,4-dihydroxyphenyl)alanine, L-3,5-diiodotyrosine, L-serine, taurine, L-thyroxine, L-tyrosine, L-tryptophane, L-threonine, L-norvaline, L-norleucine, L-valine, L-hystidine, L-4-hydroxyproline, L-δ-hydroxylysine, L-phenylalanine, L-proline, L-homoserine, L-methionine, L-1-methylhistidine, L-3-methylhistidine, L-lanthionine, L-lysine, and L-leucine. Among them, L-asparagine, L-aspartic acid, L-alanine, β-alanine, L-alginine, L-isoleucine, glycine, L-glutamine, L-glutamic acid, L-cystine, L-cysteine, L-serine, L-tyrosine, L-tryptophane, L-threonine, L-valine, L-hystidine, L-4-hydroxyproline, L-δ-hydroxylysine, L-phenylalanine, L-proline, L-methionine, L-lysine and L-leucine are preferred. Glycine is most preferred. Optical isomers (D-form) of these compounds are also usable. These amino acids may be used singly or as a mixture thereof. These amino acids are preferably used in an amount of 0.01 to 50% by weight, more preferably 0.2 to 10% by weight, based on the polymer (A). When the amount is less than 0.1% by weight, the effect of addition of this compound is insufficient and the long-lasting ability to form coating eroded gradually during usage in the seawater tends to deteriorate. When the amount is more than 50% by weight, water resistance of the coating tends to lower.

The compounds having one or more carboxyl groups in the molecule, usable as compound (B) in the present invention, include saturated fatty acids, unsaturated fatty acids, aliphatic dibasic acids, aromatic dibasic acids and aromatic tribasic acids. Preferred examples thereof are $C_{10-30}$ saturated or unsaturated fatty acids such as capric acid, undecanoic acid, lauric acid, tridecanoic acid, myristic acid, pentadecanoic acid, palmitic acid, heptadecanoic acid, stearic acid, nonadecanoic acid, arachidic acid, palmitoleic acid, oleic acid, elaidic acid, linolenic acid and linolic acid; aliphatic saturated dibasic acids such as malonic acid, methylmalonic acid, ethylmalonic acid, succinic acid, methylsuccinic acid, adipic acid, methyladipic acid, pimelic acid, suberic acid, azelaic acid and sebacic acid; aliphatic unsaturated dibasic acids such as maleic acid and itaconic acid; aromatic dibasic acids such as phthalic acid, isophthalic acid and terephthalic acid; and aromatic tribasic acids such as trimellitic acid. The above compounds may be used singly or as a mixture thereof.

Of these compounds, those having a melting point of 0° C. or above, preferably 10° C. or above, more preferably 20° C. or above, are favorable as these compounds when added scarcely produce the effect of lowering antifouling coating film strength.

Among the above-mentioned compounds, lauric acid, myristic acid, palmitic acid, stearic acid, malonic acid, methylmalonic acid, ethylmalonic acid, succinic acid, methylsuccinic acid, adipic acid, methyladipic acid, pimelic acid, suberic acid, azelaic acid, sebacic acid, maleic acid, itaconic acid, phthalic acid, isophthalic acid and terephthalic acid are preferred as their effect of improving the ability to form coating eroded gradually during usage in the seawater is high. Adipic acid, sebacic acid, maleic acid, itaconic acid, phthalic acid, isophthalic acid and terephthalic acid are especially preferred. The amount of this compound used is preferably 1 to 200% by weight, more preferably 5 to 50% by weight, based on the polymer (A). When the amount is less than 1% by weight, the effect of addition of this compound is insufficient and the long-lasting ability to form coating eroded gradually during usage in the seawater tends to deteriorate. When the amount exceeds 200% by weight, durability of the coating in the seawater tends to lower.

The "compound having both hydrophobic and hydrophilic groups in the molecule" usable as compound (B) in this invention refers to the compounds having both hydrophobic group and hydrophilic group in one molecule.

The hydrophobic group referred to herein includes the straight, branched or cyclic alkyl groups, aryl groups and aralkyl groups which have 4 or more carbon atoms and which may have a substituent, and the hydrocarbon groups which have 4 or more carbon atoms and which may have a substituent forming a cyclic compound with a hydrophilic group.

Preferred of these compounds are those having in the molecule only one hydrophilic group bonded to the hydrocarbon groups (when two or more valences are present in the hydrophilic group, all of them are bonded to the hydrocarbon groups) and having as hydrophobic group a straight, branched or cyclic alkyl group, aryl group or aralkyl group having 4 or more carbon atoms, preferably 4 to 30 carbon atoms, or a polyvalent hydrocarbon group having 4 or more carbon atoms, preferably 4 to 30 carbon atoms, which may have a substituent and forms a cyclic structure with a hydrophilic group interposed therebetween, wherein at least one of the hydrocarbon groups bonded to the hydrophilic group may have a substituent.

As examples of said substituent, halogen atoms such as F, Cl, Br and I, and silicon-containing substituents can be cited.

As for the hydrophilic group, those of the following formulae can be cited as preferred examples:

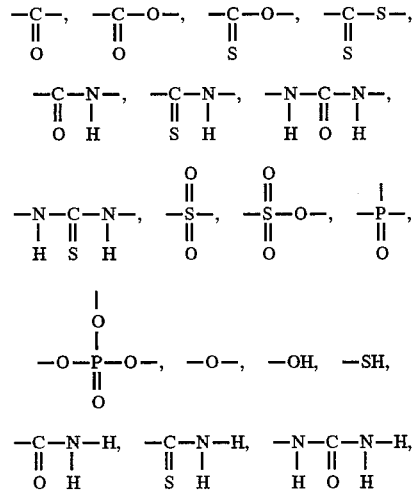

and 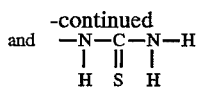

Preferred examples of the hydrophobic groups are monovalent hydrocarbon groups such as butyl, isobutyl, sec-butyl, tert-butyl, pentyl, sec-pentyl, tert-pentyl, neopentyl, hexyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, cyclopropyl, cyclobutyl, cyclopentyl, cyclohexyl, phenyl, o-tolyl, m-tolyl, p-tolyl, 2,3-xylyl, 2,4-xylyl, o-cumenyl, m-cumenyl, p-cumenyl, mesityl, benzyl, phenetyl, naphthyl and norbornyl, and divalent hydrocarbon groups such as tetramethylene, pentamethylene, hexamethylene and octamethylene.

Preferred examples of the compounds are alcohols having 12 or more carbon atoms, such as dodecanol, tetradecanol, hexadecanol, octadecanol and triphenylmethanol; long-chain carboxylic acid esters having 12 or more carbon atoms, such as methyl n-caproate, ethyl n-caproate, propyl n-caproate, isopropyl n-caproate, n-butyl n-caproate, isobutyl n-caproate, sec-butyl n-caproate, tert-butyl n-caproate, methyl n-caprylate, ethyl n-caprylate, propyl n-caprylate, isopropyl n-caprylate, n-butyl n-caprylate, isobutyl n-caprylate, sec-butyl n-caprylate, tert-butyl n-caprylate, methyl n-caprate, ethyl n-caprate, propyl n-caprate, isopropyl n-caprate, n-butyl n-caprate, isobutyl n-caprate, sec-butyl n-caprate, tert-butyl n-caprate, methyl laurate, ethyl laurate, propyl laurate, isopropyl laurate, n-butyl laurate, isobutyl laurate, sec-butyl laurate, tert-butyl laurate, methyl myristate, ethyl myristate, propyl myristate, isopropyl myristate, n-butyl myristate, isobutyl myristate, sec-butyl myristate, tert-butyl myristate, methyl palmitate, ethyl palmitate, propyl palmitate, isopropylpalmitate, n-butyl palmitate, isobutyl palmitate, sec-butyl palmitate, tert-butyl palmitate, methyl stearate, ethyl stearate, propyl stearate, isopropyl stearate, n-butyl stearate, isobutyl stearate, sec-butyl stearate, and tert-butyl stearate; phosphoric esters such as trioctyl phosphate, triphenyl phosphate and tricresyl phosphate; phosphine oxides such as trioctylphosphine oxide and triphenylphosphine oxide; amides such as benzamide, benzanilide, lauric acid amide, lauric acid anilide, myristic acid amide, myristic acid anilide, palmitic acid amide, palmitic acid anilide, stearic acid amide, stearic acid anilide and ε-caprolactum; ureas such as phenylurea and diphenylurea; and thioureas such as phenylthiourea and diphenylthiourea. The above compounds may be used singly or as a mixture thereof.

Of these compounds, those having a melting point of 0° C. or above, preferably 10° C. or above, more preferably 20° C. or above, are preferred because of small influence of lowering strength of the antifouling coating film. Further, methyl myristate, ethyl myristate, methyl palmitate, ethyl palmitate, methyl stearate, ethyl stearate, triphenyl phosphate, tricresyl phosphate, trioctylphosphine oxide and triphenylphosphine oxide are preferred for their high effect of improving the long-lasting ability to form coating eroded gradually during usage in the seawater. Ethyl palmitate, ethyl stearate, triphenyl phosphate, trioctylphosphine oxide and triphenylphosphine oxide are especially preferred.

The amount of this compound used in this invention is preferably 1 to 200% by weight, more preferably 5 to 50% by weight, based on the polymer (A). When the amount is less than 1% by weight, the effect of addition of this compound is insufficient and the long-lasting ability to form coating eroded gradually during usage in the seawater tends to deteriorate. When the amount exceeds 200% by weight, durability of the coating in the seawater tends to lower.

The chelate compounds usable as compound (B) include ethylenediaminetetraacetic acid, nitrilotriacetic acid, iminodiacetic acid, cyclohexanediaminetetraacetic acid, glycol ether diaminetetraacetic acid, ethyl ether diaminetetraaceticacid, dihydroxyethylglycin, acetylacetoneethylenediimine, zinc thiocyanate, sodium thiocyanate, potassium thiocyanate, magnesium thiocyanate, 2,3-dimercaptopropanol, diethyldithiocarbamic acid, sodium salt of diethyldithiocarbamic acid, calcium salt of diethyldithiocarbamic acid, zinc salt of diethyldithiocarbamic acid, thiourea, thiocarbazide, thioglycollic acid and 1,10-phenanthroline. The above compounds may be used singly or as a mixture thereof.

Of these compounds, ethylenediaminetetraacetic acid, nitrilotriacetic acid, acetylacetoneethylenediimine, zinc thiocyanate, potassium thiocyanate, 2,3-dimercaptopropanol, calcium salt of diethyldithiocarbamic acid, thioglycollic acid and 1,10-phenanthroline are preferred for their high effect. The chelate compound is preferably used in an amount of 0.01 to 50% by weight, more preferably 0.2 to 10% by weight, based on the polymer (A). When the amount is less than 0.1% by weight, the effect of addition of the compound is insufficient and the long-lasting ability to form coating eroded gradually during usage in the seawater tend to deteriorate. When the amount exceeds 50% by weight, durability of the coating in the seawater tends to lower.

As the hydroxyl- or acetyl-substituted carboxylic acid ester usable as compound (B), the compounds represented by the following formula (II) are preferred:

wherein $R^3$ and $R^4$ represent independently a hydrogen atom or an alkyl group having 1–5 carbon atoms; $R^5$ is a hydroxyl group or an acetyl group; and $R^6$ is an alkyl group having 1–5 carbon atoms.

Examples of these compounds include methyl acetoacetate, ethyl acetoacetate, propyl acetoacetate, butyl acetoacetate, amyl acetoacetate, methyl lactate, ethyl lactate, propyl lactate, butyl lactate, amyl lactate, methyl α-hydroxyisobutyrate, ethyl α-hydroxyisobutyrate, methyl α-hydroxybutyrate and ethyl α-hydroxybutyrate. The above compounds may be used singly or as a mixture thereof.

Of these compounds, methyl lactate, ethyl lactate, methyl α-hydroxyisobutyrate and ethyl α-hydroxyisobutyrate are preferred for their high effect. Ethyl lactate and ethyl α-hydroxyisobutyrate are especially preferred.

The amount of this compound used is preferably 0.01 to 50% by weight, more preferably 0.2 to 10% by weight, based on the polymer (A). When the amount is less than 0.01% by weight, the effect of addition of the compound is insufficient and thickening of the composition tends to take place when a copper compound is used for preparation of the coating composition. When the amount exceeds 50% by weight, it becomes hard to form a good coating.

The "ion-exchangeable layer clay minerals" usable as compound (B) in the present invention are those of the so-called phyllosilicate minerals which are characterized by the presence of ion-exchangeable alkali metal ions between the silicate layers. These clay minerals may be either natural products or the artificially synthesized ones, but the latter are preferred because of less contamination by the impurities and more constant composition. Of these ion-exchangeable phyllosilicate minerals, those classified as 2:1 type are preferred because of their high effect of improving the long-lasting ability to form coating eroded gradually during usage in the seawater. Those belonging to the smectites group are more preferred. Preferred examples of such silicate minerals are sodium fluorotetrasilicic mica, sodium taeniolite, lithium taeniolite, sodium hectorite and lithium hectorite.

The above clay minerals may be used singly or as a mixture thereof.

The clay mineral is preferably used in an amount of 1 to 200% by weight, more preferably 3 to 100% by weight, based on the polymer (A). When the amount is less than 1% by weight, the effect of addition is insufficient and the long-lasting ability to form coating eroded gradually during usage in the seawater tends to deteriorate. When the amount exceeds 200% by weight, water resistance of the coating tends to lower.

The "pulverized inorganic material which has been made lipophilic with an organic material" usable as compound (B) in this invention means a product obtained by modifying a base pulverized inorganic material to make it lipophilic with an organic material. The pulverized inorganic material used as base may vary, but there can be used, for example, metal oxides such as silica, alumina, silica-alumina, titania and magnesia; layer clay minerals such as bentonite, sodium fluorotetrasilicic mica, sodium taeniolite, lithium taeniolite, sodium hectorite, lithium hectorite and talc; zeolite, barium sulfate and the like. The organic material used for making the base inorganic material lipophilic may be selected from various organic materials, but it is preferred to use a compound having in its molecule a functional group (such as ammonium group) which is physically or chemically adsorbed or bonded to the base inorganic material and also having as hydrophobic group a hydrocarbon group (such as straight, branched or cyclic alkyl group, aryl group or aralkyl group) which has 4 or more, preferably 4 to 30 carbon atoms, and may have a substituent. The above inorganic materials may be used singly or as a mixture thereof.

Preferred examples of the inorganic material used in this invention are LUCENTITE, SAN, STN and SPN (produced by Co-op Chemical Co., Ltd.) which are lipophilic smectites and KASEIGEL ODS (produced by Tokyo Chemical Industry Co., Ltd.) which is octadecylsilica gel.

The amount of the inorganic material used in this invention is preferably 1 to 200% by weight, more preferably 5 to 50% by weight, based on the polymer (A). When the amount is less than 1% by weight, the effect of addition is insufficient and the long-lasting ability to form coating eroded gradually during usage in the seawater tend to deteriorate. When the amount exceeds 200% by weight, durability of the coating in the seawater tends to lower.

The compounds (b2) usable as compound (B) in the present invention are those which are crystallizable and selected from polyether compounds, polyester compounds, polyether-polyester compounds, olefinic glycol compounds, acrylic esters, methacrylic esters and polycarbonate compounds.

The polyether compounds usable in this invention include diol type or triol type polyethers such as polyethylene oxide-polypropylene oxide, polytetramethylene oxide, polyethylene oxide-polypropylene oxide, and polyethylene oxide-polytetramethylene oxide, those of said polyethers in which acrylic or methacrylic acid is added to the whole or part of the molecular end, and monoacrylates or methacrylates of alkoxyalkylene glycols such as methoxypolyethylene glycol, methoxypolypropylene glycol, methoxytetramethylene glycol and ethoxypolyethylene glycol (commercially available under the trade name of BLEMMER PME Series (NOF Corp.), etc.). The above polyether compounds may be used singly or as a mixture thereof.

The polyester compounds include diol type or triol type polyesters such as poly-ε-caprolactone and poly-β-propiolactone, and those of said polyesters in which acrylic acid or methacrylic acid is added to the whole or part of the molecular end. The above polyester compounds may be used singly or as a mixture thereof.

The polyether-polyester compounds include polyether-polyesters such as polyethylene oxide poly-ε-caprolactone, polypropylene oxide poly-ε-caprolactone and polytetramethylene oxide poly-ε-captrolactone. The above polyether-polyester compounds may be used singly or as a mixture thereof.

The olefinic glycol compounds include the compounds represented by the following formula (III):

wherein $R^7$ and $R^8$ represent independently a hydrogen atom or a $C_{1-26}$ straight or branched alkyl group, and the total number of the carbon atoms of $R^7$ and $R^8$ is 12 to 26. The above olefinic glycol compounds may be used singly or as a mixture thereof.

Preferred examples of the acrylic acid esters and methacrylic acid esters usable as compound (B) in this invention are esters of alkylacrylates and alkyl methacrylates having 14–28 carbon atoms, such as tetradecyl ester, pentadecyl ester, hexadecyl ester, heptadecyl ester, octadecyl ester, nonadecyl ester, eicosadecyl ester, heneicosyl ester and docosyl ester.

The polycarbonate compounds include polycarbonate diols such as PLACCEL CD-208, 210 and 220 which are commercial products available from DAICEL CHEMICAL INDUSTRIES, LTD. The above polycarbonate compounds may be used singly or as a mixture thereof.

Of these compounds, those having a number-average molecular weight of 200 to 50,000 and a melting point of 20° C. or above are preferred as their influence to lower strength of the antifouling coating is small.

The compound (b2) is preferably used in an amount of 0.01 to 50% by weight, more preferably 5 to 30% by weight, based on the polymer (A). When the amount is less than 0.01% by weight, the effect of addition of the compound is insufficient and the long-lasting ability to form coating eroded gradually during usage in the seawater tend to deteriorate. When the amount exceeds 50% by weight, water resistance of the coating tends to lower.

In the present invention, it is also preferred to add at least one compound (C) selected from triazole derivatives, thiadiazole derivatives and benzothiazole derivatives as addition of compound (C) is highly effective for preventing thickening of the composition due to use of a copper compound as an antifouling agent.

The triazole derivatives usable as compound (C) in the present invention include benzoatriazole derivatives, amino-substituted triazole derivatives and other triazole derivatives.

Examples of the benzotriazole derivatives are 1,2,3-benzotriazole, 1-methyl-1,2,3-benzotriazole, 1-phenyl-1,2,3-benzotriazole, 2-phenyl-1,2,3-benzotriazole, 4-chloro-1,2, 3-benzotriazole, 4-nitro-1,2,3-benzotriazole, 5-methyl-1,2, 3- benzotriazole, 5-ethyl-1,2,3-benzotriazole, 5-propyl-1,2, 3- benzotriazole, 5-isobutyl-1,2,3-benzotriazole, 5-methoxy-1,2,3-benzotriazole, 5-chloro-1,2,3-benzotriazole, 5,6-dimethyl-1,2,3-benzotriazole, 1,2,3-benzotriazole carboxylic acid and ester derivatives thereof, and N-dialkylaminomethyl-1,2,3-benzotriazole. Examples of the amino-substituted triazole derivatives are 4-amino-1, 2,4-triazole and 3-amino-1H-1,2,3-benzotriazole. Other triazole derivatives include alkyl, aryl, aralkyl, halogen and hydroxyl substituted triazole derivatives, such as 1,2,3-triazole, 1-methyl-1,2,3-triazole, 1-phenyl-1,2,3-triazole, 1-benzyl-1,2,3-triazole, 2-methyl-1,2,3-triazole, 2-phenyl-1,2,3-triazole, 2-benzyl-1,2,3-triazole, 4-methyl-1,2,3-triazole, 4-phenyl-1,2,3-triazole, 4-hydroxy-1,2,3-triazole, 4,5-dimethyl-1,2,3-triazole, 4-methyl-2-phenyl-1,2,3-triazole, 4,5-dimethyl-2-phenyl-1,2,3-triazole, 1,5-diphenyl-1,2,3-triazole, 1,2,4-triazole, 1-methyl-1,2,4-triazole, 1-phenyl-1,2,4-triazole, 3-methyl-1,2,4-triazole, 3-phenyl-1,2,4-triazole, 3-chloro-1,2,4-triazole, 3-bromo-1,2,4-triazole, 3,5-dimethyl-1,2,4-triazole, 3,5-diethyl-1,2,4-triazole, 1,3-diphenyl-1,2,4-triazole, 1,5-diphenyl-1,2,4-triazole, and 3,5-diphenyl-1,2,4-triazole.

The benzothiazole derivatives used as compound (C) in this invention are preferably sulfur-substituted benzothiazole derivatives, such as 2-mercaptobenzo-thiazole, dibenzothiazyldisulfide, N-oxydiethylenebenzo-thiazole-2-sulfenamide, N,N-diisopropylbenzothiazyl-2-sulfenamide, N,N-dicyclohexylbenzothiazole-2-sulfenamide, 3-(2-benzothiazylthio)propionic acid, and (2-benzothiazylthio) acetic acid. The thiadiazole derivatives used in this invention are preferably sulfur-substituted ones, such as 2-mercapto-1,3,4-thiadiazole, 2,5-dimercapto-1,3,4- thiadiazole, 2-amino-5-mercapto-1,3,4-thiadiazole, 2-methyl-5-mercapto-1,3,4=thiadiazole, 2-aminothiazole, 2-methylamino-5-mercapto-1,3,4-thiadiazole, and 2-thioacetic acid-5-mercapto-1,3,4-thiadiazole.

Among these compounds (C), the triazole derivatives such as 1,2,3-benzotriazole, 1,2,4-triazole and 3-amino-1H-1,2,4-triazole are preferred for their high effect.

These compounds (C) may be used singly or as a mixture thereof. The amount thereof used is preferably in the range of 0.1 to 50% by weight, more preferably 0.2 to 10% by weight, based on the polymer (A). When the amount is less than 0.1% by weight, the effect of addition of the compound is insufficient and thickening of the composition tends to take place when a copper compound is used for preparation of the coating composition. When the amount exceeds 50% by weight, it is hard to form a good coating.

In the coating composition of the present invention, a polymer or polymers other than said polymers (A) may be mixed within limits not impairing the effect of the present invention. The above polymer or polymers can be preferably used in amounts of 100% by weight or less, more preferably, 50% by weight or less, based on the amount of the polymer (A).

In said coating composition may also be blended a known colorant such as pigment, a known antifouling agent and various additives (extender, dispersing agent, anti-sagging agent, etc.) to form an antifouling coating composition.

The antifouling agent used in the antifouling coating composition of this invention is preferably one whose main component (50% by weight or more of the whole agent) is a copper compound which is an inorganic antifouling agent. Examples of the copper compounds usable for said purpose are cupric chromate, cupric ferrocyanate, cupric quinoline, cupric δ-hydroquinone, cuptic oleate, cupric nitrate, cupric phosphate, cupric tartarate, cuprous oxide, copper rhodanide, copper-nickel solid solution alloys, cuprous iodide and cuprous sulfite. Among them, cuprous oxide, copper rhodamide and copper-nickel solid solution alloys are preferred, Among other typical inorganic antifouling agents are zinc oxide, zinc chromate and strontium chromate. Examples of the organic antifouling agents are 2,4,5,6-tetrachloroisophthalonitrile, N,N-dimethyl-dichlorophenylurea, 4,5-dichloro-2-n-octyl-3(2H)-isothiazolone, zinc dimethyldithiocarbamate, 2-methyl-thio-4-t-butylamino-6-cyclopropylamino-s-triazine, N-(fluorodichloromethylthio)phthalimide, N,N'-dimethyl-N'-phenyl-(N-fluorodichloromethylthio)sulfamide, 2-pyridinethiol-1-oxide zinc salt, tetramethylthiuramdisulfide, 2,4,6-trichlorophenylmaleimide; 2,3,5,6-tetrachloro-4-(methylsulfonyl)pyridine, 3-iodo-2-propenylbutylcarbamate, diiodomethyl-para-trisulfone, bisdimethyldithiocarbamoyl zinc ethylenebisdithiocarbamate, and pyridine-triphenylborane.

As the antifouling agent, it is possible to use organotin compounds, triazine compounds and organic sulfur compounds.

The amount of the antifouling agent used may vary, but it is preferably 1 to 500% by weight, more preferably 50 to 450% by weight, more preferably 50 to 350% by weight, based on the total amount of the polymer (solid resin content). When the amount is less than 1% by weight, there is scarcely produced the effect of the antifouling agent, and when the amount exceeds 500% by weight, it is hard to form a good coating.

As the pigment, there can be used inorganic pigments such as titanium oxide (titanium white), iron oxide, carbon black, etc., and organic pigments such as azos, cyanines, phthalocyanines, quinacridones, etc.. Usually, inorganic pigments are used. Pigment is used as required. When it is used, its amount used may vary but preferably not more than 200% by weight based on the total amount of the polymer (solid resin content). When pigment is used in excess of 200% by weight, the formed coating tends to deteriorate in stability.

As the extender, there can be used calcium carbonate, barium sulfate, magnesium oxide, alumina, zeolite, etc. Extender is used where necessary. When it is used, its amount used may not be specified but preferably in the range not exceeding 100% by weight based on the total amount of the polymer (solid resin content). When extender is used in excess of 100% by weight, the formed coating tends to deteriorate in stability.

As the dispersing or anti-sagging agent, there can be used inorganic dispersing or anti-sagging agents such as silica gel, bentonite, kaolinite, talc, hectolite, montomorillonite, saponite, beidellite, etc., and organic dispersing or anti-sagging agents such as fatty acid amides, fatty acid esters, oxidized polyethylene, sulfuric acid ester-based anionic surfactants, polycarboxylic acid amine salts, polycarboxylic acids, polyamides, high polymer polyethers, acrylic copolymers, special silicones, etc. The amount of the agent used may vary but preferably in the range of 0.01 to 100% by weight based on the total amount of the polymer (solid resin content). When the amount is less than 0.01% by weight, the effect of addition of the agent scarcely presents itself, and when the amount exceeds 100% by weight, the coating stability tends to deteriorate. It is also possible to use a release assistant such as rosin, gum rosin, wood rosin, tall oil rosin, etc.

The antifouling coating composition of the present invention obtained in the manner described above is useful as ship bottom paints, fish-net paints, etc.

The present invention is further described below with reference to the Examples. The invention, however, is not subject to any limitation by these Examples.

Production Example 1

In a four-necked flask equipped with a stirrer, a condenser, a nitrogen gas feed pipe, a dropping funnel and a thermometer, 125.0 g of xylene was placed and kept at 95° C. with stirring. Then, a mixture of 234.2 g of n-butylmethacrylate, 15.8 g of methacrylic acid and 2.5 g of 2,2'-azobis(isobutyronitrile) (hereinafter referred to as AIBN) was added dropwise into the flask over a period of 3 hours with stirring under a nitrogen gas stream. After the dropwise addition, the mixture was maintained at 95° C. for one hour with stirring. Then, a mixture of 50.0 g of xylene and 0.5 g of AIBN was added dropwise into the flask with stirring over a period of 1 hour, and the obtained mixture was kept at 95° C. for 2 hours with stirring. After adding 20.0 g of xylene and then 41.6 g of n-butanol, the mixture was cooled naturally to prepare a coating varnish in an amount of 666.6 g with a resin content of 37.5% by weight. The number-average molecular weight of the resulting polymer was 21,400.

Production Example 2

In a four-necked flask equipped with a stirrer, a condenser, a nitrogen gas feed pipe, a dropping funnel and a thermometer, 72.0 g of n-butanl was placed and refluxed with stirring. Then, a mixture of 64.5 g of n-butyl acrylate, 45.1 g of methacrylic acid, 10.4 g of Illustrated Compound No. (9) ($R=CH_3$) and 1.8 g of AIBN was added dropwise into the flask with stirring over a period of 2 hours under a nitrogen gas stream. After dropwise addition, the mixture was further refluxed with stirring for one hour. Then, a mixture of 18.0 g of n-butanol and 0.24 g of AIBN was added dropwise into the flask with stirring over a period of one hour, and the obtained mixture was refluxed with stirring for 2 hours. After adding 90.0 g of xylene, the mixture was cooled naturally to prepare a coating varnish in an amount of 300 g with a resin content of 42.0% by weight. The number-average molecular weight of the resulting polymer was 7,800.

Production Example 3

In a four-necked flask equipped with a stirrer, a condenser, a nitrogen gas feed pipe, a dropping funnel and a thermometer, 72.0 g of n-butanol was placed and refluxed with stirring. Then, a mixture of 62.8 g of n-butyl acrylate, 46.9 g of methacrylic acid, 10.3 g of Illustrated Compound No. (2) ($R=CH_3$) and 1.8 g of AIBN was added dropwise into the flask with stirring over a period of 2 hours under a nitrogen gas stream. After dropwise addition, the mixture was further refluxed with stirring for one hour. Then, a mixture of 18.0 g of n-butanol and 0.24 g of AIBN was added dropwise into the flask with stirring over a period of one hour, and the obtained mixture was refluxed with stirring for 2 hours. After adding 90.0 g of xylene, the mixture was cooled naturally to prepare a coating varnish in an amount of 300 g with a resin content of 40.0% by weight. The number-average molecular weight of the resulting polymer was 7,200.

Production Example 4

In a four-necked flask equipped with a stirrer, a condenser, a nitrogen gas feed pipe, a dropping funnel and a thermometer, 75.0 g of xylene and 16.11 g of maleic anhydride were placed and maintained at 95° C. Then, a mixture of 52.58 g of n-butyl methacrylate, 40.74 g of 2-ethylhexyl methacrylate, 40.81 g of Illustrated Compound No. (9) ($R=CH_3$) and 0.60 g of AIBN was added dropwise into the flask with stirring over a period of 3 hours under a nitrogen gas stream. After dropwise addition, the mixture was further stirred at 95° C. for one hour. Then, a mixture of 15.0 g of xylene and 0.30 g of AIBN was added dropwise into the flask with stirring over a period of one hour, after which the mixture was kept at 95° C. for 30 minutes. Then, a mixture of 15.0 g of xylene and 0.30 g of AIBN was further added dropwise with stirring over a period of 30 minutes. The obtained mixture was kept at 95° C. with stirring for 2 hours. After adding 45.0 g of xylene, the mixture was cooled naturally to prepare a coating varnish in an amount of 300 g with a resin content of 50.1% by weight. The number-average molecular weight of the resulting polymer was 16,400.

Production Example 5

In a four-necked flask equipped with a stirrer, a condenser, a nitrogen gas feed pipe, a dropping funnel and a thermometer, 75.0 g of xylene and 15.38 g of maleic anhydride were placed and kept at 95° C. with stirring. Then, a mixture of 17.91 g of ethyl methacrylate, 77.77 g of 2-ethylhexyl methacrylate, 38.95 g of Illustrated Compound No. (9) ($R=CH_3$) and 0.60 g of AIBN was added dropwise into the flask with stirring over a period of 3 hours under a nitrogen gas stream. After dropwise addition, the mixture was further stirred at 95° C. for one hour. Then, a mixture of 15.0 g of xylene and 0.30 g of AIBN was added dropwise into the flask with stirring over a period of one hour, after which the mixture was kept at 95° C. for 30 minutes. Then a mixture of 15.0 g of xylene and 0.30 g of AIBN was further added dropwise into the flask with stirring over a period of 30 minutes. The obtained mixture was kept at 95° C. with stirring for 2 hours. After adding 45.0 g of xylene, the mixture was cooled naturally to prepare a coating varnish in an amount of 300 g with a resin content of 50.0% by weight. The number-average molecular weight of the resulting polymer was 21,600.

Production Example 6

In a four-necked flask equipped with a stirrer, a condenser, a nitrogen gas feed pipe, a dropping funnel and a thermometer, 75.0 g of xylene and 15.61 g of maleic anhydride were placed and kept at 95° C. with stirring. Then, a mixture of 15.94 g of methyl methacrylate, 78.95 g of 2-ethylhexyl methacrylate, 39.54 g of Illustrated Compound No. (9) ($R=CH_3$) and 0.60 g of AIBN was added dropwise into the flask with stirring over a period of 3 hours under a nitrogen gas stream. After dropwise addition, the mixture was further stirred at 95° C. for one hour. Then, a mixture of 15.0 g of xylene and 0.30 g of AIBN was added dropwise into the flask with stirring over a period of one hour, after which the resulting mixture was kept at 95° C. for 30 minutes. Then a mixture of 15.0 g of xylene and 0.30 g of AIBN was further added dropwise into the flask with stirring over a period of 30 minutes. The obtained mixture was maintained at 95° C. for 2 hours. After adding 45.0 g of xylene, the mixture was cooled naturally to prepare a coating varnish in an amount of 300 g with a resin content of 50.0% by weight. The number-average molecular weight of the resulting polymer was 26,100.

Production Example 7

In a four-necked flask equipped with a stirrer, a condenser, a nitrogen gas feed pipe, a dropping funnel and a thermometer, 250.0 g of xylene and 59.81 g of maleic anhydride were placed and kept at 95° C. with stirring. Then, a mixture of 137.40 g of methyl methacrylate, 151.22 g of 2-ethylhexyl methacrylate, 151.46 g of Illustrated Compound No. (9) (R=CH$_3$) and 2.00 g of AIBN was added dropwise into the flask with stirring over a period of 4 hours under a nitrogen gas stream. After dropwise addition, the mixture was further stirred at 95° C. for one hour. Then, a mixture of 50.0 g of xylene and 1.00 g of AIBN was added dropwise over a period of one hour, after which the obtained mixture was kept at 95° C. for 30 minutes. Then a mixture of 50.0 g of xylene and 1.00 g of AIBN was further added dropwise into the flask with stirring over a period of 30 minutes. The obtained mixture was kept at 95° C. for 2 hours. After adding 150.0 g of xylene, the mixture was cooled naturally to prepare a coating varnish in an amount of 1000 g with a resin content of 50.0% by weight. The number-average molecular weight of the resulting polymer was 24,800.

Production Example 8

In a four-necked flask equipped with a stirrer, a condenser, a nitrogen gas feed pipe, a dropping funnel and a thermometer, 125.0 g of xylene was placed and kept at 95° C. with stirring. Then, a mixture of 234.2 g of n-butyl methacrylate, 15.8 g of methacrylic acid and 2.5 g of AIBN was added dropwise into the flask with stirring over a period of 3 hours under a nitrogen gas stream. After dropwise addition, the mixture was further stirred at 95° C. for one hour. Then a mixture of 50.0 g of xylene and 0.5 g of AIBN was added dropwise into the flask with stirring over a period of one hour, and the obtained mixture was kept at 95° C. for 2 hours with stirring. After adding 575.0 g of xylene, the mixture was cooled naturally to prepare a coating varnish in an amount of 1000 g with a resin content of 25.0% by weight. The number-average molecular weight of the resulting polymer was 22,000.

Production Example 9

In a four-necked flask equipped with a stirrer, a condenser, a nitrogen gas feed pipe, a dropping funnel and a thermometer, 150.0 g of n-butanol was placed and kept at 120° C. with stirring. Then, a mixture of 67.3 g of methylmethacrylate, 86.0 g of n-butyl acrylate, 96.7 g of acrylic acid and 3.8 g of AIBN was added dropwise into the flask with stirring over a period of 2 hours under a nitrogen gas stream. After dropwise addition, the mixture was further stirred at 120° C. for one hour. Then, a mixture of 100.0 g of xylene and 2.0 g of AIBN was added dropwise into the flask with stirring over a period of one hour, and the obtained mixture was kept at 120° C. for 2 hours with stirring. After adding 87.5 g of xylene and 25.0 g of n-butanol, the mixture was cooled naturally to prepare a coating varnish in an amount of 612.5 g with a resin content of 40.8% by weight. The number-average molecular weight of the resulting polymer was 13,000.

Production Example 10

In a four-necked flask equipped with a stirrer, a condenser, a nitrogen gas feed pipe, a dropping funnel and a thermometer, 75.0 g of xylene and 22.06 g of maleic anhydride were placed and kept at 95° C. with stirring. Then, a mixture of 127.94 g of n-butyl methacrylate and 0.60 g of AIBN was added dropwise into the flask with stirring over a period for 3 hours under a nitrogen gas stream. After dropwise addition, the mixture was further stirred at 95° C. for one hour. Then a mixture of 15.0 g of xylene and 0.30 g of AIBN was added dropwise into the flask with stirring over a period of one hour, after which the resulting mixture was kept at 95° C. for 30 minutes. Then, a mixture of 15.0 g of xylene and 0.30 g of AIBN was further added dropwise into the flask with stirring over a period of 30 minutes. The obtained mixture was kept at 95° C. for 2 hours. After adding 45.0 g of xylene, the mixture was cooled naturally to prepare a coating varnish in an amount of 300 g with a resin content of 50.0% by weight. The number-average molecular weight of the resulting polymer was 13,400.

Examples 1–3

Coating compositions were prepared by adding 0.5 g of ethylenediaminetetraacetic acid to 50 g of resin solids of the varnishes produced in the above Production Examples 1–3 and mixing them well.

Examples 4–6

Coating compositions were prepared by adding 0.5 g of acetylacetoneethylenediimine to 50 g of resin solids of the varnishes produced in the above Production Examples 1–3 and mixing them well.

Examples 6–9

Coating compositions were prepared by adding 0.5 g of methyl acetoacetate to 50 g of resin solids of the varnishes produced in the above Production Examples 1–3 and mixing them well.

Examples 10–12

Coating compositions were prepared by adding 0.5 g of ethyl lactate to 50 g of resin solids of the varnishes produced in the above Production Examples 1–3 and mixing them well.

Examples 13–15

Coating compositions were prepared by adding 2.5 g of L-asparagine and 0.5 g of 3-amino-1H-1,2,4-triazole to 50 g of resin solids of the varnishes produced in the above Production Examples 1–3 and mixing them well.

Examples 16–18

Coating compositions were prepared by adding 2.5 g of L-alanine and 0.5 g of 3-amino-1H-1,2,4-triazole to 50 g of resin solids of the varnishes produced in the above Production Examples 1–3 and mixing them well.

Examples 19–21

Coating compositions were prepared by adding 2.5 g of glycine and 0.5 g of 3-amino-1H-1,2,4-triazole to 50 g of resin solids of the varnishes produced in the above Production Examples 1–3 and mixing them well.

Examples 22–24

Coating compositions were prepared by adding 2.5 g of L-tryptophane and 0.5 g of 3-amino-1H-1,2,4-triazole to 50 g of resin solids of the varnishes produced in the above Production Examples 1–3 and mixing them well.

Examples 25–27

Coating compositions were prepared by adding 2.5 g of L-valine and 0.5 g of 3-amino-1H-1,2,4-triazole to 50 g of resin solids of the varnishes produced in the above Production Examples 1-3 and mixing them well.

Examples 28–30

Coating compositions were prepared by adding 2.5 g of L-histidine and 0.5 g of 3-amino-1H-1,3,4-triazole to 50 g of resin solids of the varnishes produced in the above Production Examples 1–3 and mixing them well.

Examples 31–33

Coating compositions were prepared by adding 2.5 g of L-phenylalanine and 0.5 g of 3-amino-1H-1,2,4-triazole to 50 g of resin solids of the varnishes produced in the above Production Examples 1–3 and mixing them well.

Examples 34–36

Coating compositions were prepared by adding 2.5 g of L-lysine and 0.5 g of 3-amino-1H-1,2,4-triazole to 50 g of resin solids of the varnishes produced in the above Production Examples 1–3 and mixing them well.

Examples 37–39

Coating compositions were prepared by adding 2.5 g of L-leucine and 0.5 g of 3-amino-1H-1,2,4-triazole to 50 g of resin solids of the varnishes produced in the above Production Examples 1–3 and mixing them well.

Examples 40–42

Coating compositions were prepared by adding 2.5 g of L-asparagine and 0.5 g of 1,2,4-triazole to 50 g of resin solids of the varnishes produced in the above Production Examples 1–3 and mixing them well.

Examples 43–45

Coating compositions were prepared by adding 2.5 g of L-alanine and 0.5 g of 1,2,4-triazole to 50 g of resin solids of the varnishes produced in the above Production Examples 1–3 and mixing them well.

Examples 46–48

Coating compositions were prepared by adding 2.5 g of glycine and 0.5 g of 1,2,4-triazole to 50 g of resin solids of the varnishes produced in the above Production Examples 1–3 and mixing them well.

Examples 49–51

Coating compositions were prepared by adding 2.5 g of L-tryptophane and 0.5 g of 1,2,4-triazole to 50 g of resin solids of the varnishes produced in the above Production Examples 1–3 and mixing them well.

Examples 52–54

Coating compositions were prepared by adding 2.5 g of L-valine and 0.5 g of 3-amino-1H-1,2,4-triazole to 50 g of resin solids of the varnishes produced in the above Production Examples 1–3 and mixing them well.

Examples 55–57

Coating compositions were prepared by adding 2.5 g of L-histidine and 0.5 g of 1,2,4-triazole to 50 g of resin solids of the varnishes produced in the above Production Examples 1–3 and mixing them well.

Examples 58–60

Coating compositions were prepared by adding 2.5 g of L-phenylalanine and 0.5 g of 1,2,4-triazole to 50 g of resin solids of the varnishes produced in the above Production Examples 1–3 and mixing them well.

Examples 61–63

Coating compositions were prepared by adding 2.5 g of L-lysine and 0.5 g of 1,2,4-triazole to 50 g of resin solids of the varnishes produced in the above Production Examples 1–3 and mixing them well.

Examples 64–66

Coating compositions were prepared by adding 2.5 g of L-leucine and 0.5 g of 1,2,4-triazole to 50 g of resin solids of the varnishes produced in the above Production Examples 1–3 and mixing them well.

Example 67

A coating composition was prepared by adding 5.0 g of ethyl palmitate and 0.5 g of 1,2,4-triazole to 50 g of resin solids of the varnish produced in the above Production Example 2 and mixing them well.

Example 68

A coating composition was prepared by adding 10.0 g of ethyl palmitate and 0.5 g of 1,2,4-triazole to 50 g of resin solids of the varnish produced in the above Production Example 2 and mixing them well.

Example 69

A coating composition was prepared by adding 5.0 g of ethyl stearate and 0.5 g of 1,2,4-triazole to 50 g of resin solids of the varnish produced in the above Production Example 2 and mixing them well.

Example 70

A coating composition was prepared by adding 10.0 g of ethyl stearate and 0.5 g of 1,2,4-triazole to 50 g of resin solids of the varnish produced in the above Production Example 2 and mixing them well.

Example 71

A coating composition was prepared by adding 5.0 g of triphenyl phosphate and 0.5 g of 1,2,4-triazole to 50 g of resin solids of the varnish produced in the above Production Example 2 and mixing them well.

Example 72

A coating composition was prepared by adding 10.0 g of triphenyl phosphate and 0.5 g of 1,2,4-triazole to 50 g of resin solids of the varnish produced in the above Production Example 2 and mixing them well.

Example 73

A coating composition was prepared by adding 5.0 g of triphenylphosphine oxide and 0.5 g of 1,2,4-triazole to 50 g of resin solids of the varnish produced in the above Production Example 2 and mixing them well.

Example 74

A coating composition was prepared by adding 10.0 g of triphenylphosphine oxide and 0.5 g of 1,2,4-triazole to 50 g of resin solids of the varnish produced in the above Production Example 2 and mixing them well.

Example 75

A coating composition was prepared by adding 5.0 g of triphenyl phosphate, 5.0 g of ethyl stearate and 0.5 g of 1,2,3-benzoatriazole to 50 g of resin solids of the varnish produced in the above Production Example 2 and mixing them well.

Example 76

A coating composition was prepared by adding 10.0 g of triphenyl phosphate, 5.0 g of ethyl stearate and 0.5 g of 1,2,3-benzotriazole to 50 g of resin solids of the varnish produced in the above Production Example 2 and mixing them well.

Example 77

A coating composition was prepared by adding 1.5 g of polyethylene glycol (number-average molecular weight: about 4,000) and 0.3 g of 3-amino-1H-1,2,4-triazole to 15 g of resin solids of the varnish produced in the above Production Example 8 and mixing them well.

Example 78

A coating composition was prepared by adding 2.0 g of PLACCEL 230 (produced by Daicel Chemical Industries Co., Ltd.) and 0.3 g of 3-amino-1H-1,2,4-triazole to 15 g of resin solids of the varnish produced in the above Production Example 8 and mixing them well.

Example 79

A coating composition was prepared by adding 1.5 g of polyethylene glycol (number-average molecular weight: about 4,000) and 0.15 g of 3-amino-1H-1,2,4-triazole to 15 g of resin solids of the varnish produced in the above Production Example 9 and mixing them well.

Example 80

A coating composition was prepared by adding 2.0 g of AOGX 68 (produced by DAICEL CHEMICAL INDUSTRIES LTD.) and 0.15 g of 3-amino-1H-1,2,4-triazole to 15 g of resin solids of the varnish produced in the above Production Example 9 and mixing them well.

Example 81

A coating composition was prepared by adding 2.0 g of hexadecyl methacrylate and 0.15 g of 3-amino-1H-1,2,4-triazole to 15 g of resin solids of the varnish produced in the above Production Example 9 and mixing them well.

Examples 82-84

Coating compositions were prepared by adding 2.5 g of L-asparagine and 0.5 g of 3-amino-1H-1,2,4-triazole to 50 g of resin solids of the varnishes produced in the above Production Examples 4-6 and mixing them well.

Examples 85-87

Coating compositions were prepared by adding 2.5 g of L-alanine and 0.5 g of 3-amino-1H-1,2,4-triazole to 50 g of resin solids of the varnishes produced in the above Production Examples 4-6 and mixing them well.

Examples 88-90

Coating compositions were prepared by adding 2.5 g of glycine and 0.5 g of 3-amino-1H-1,2,4-triazole to 50 g of resin solids of the varnishes produced in the above Production Examples 4-6 and mixing them well.

Examples 91-93

Coating compositions were prepared by adding 2.5 g of L-tryptophane and 0.5 g of 3-amino-1H-1,2,4-triazole to 50 g of resin solids of the varnishes produced in the above Production Examples 4-6 and mixing them well.

Examples 94-96

Coating compositions were prepared by adding 2.5 g of L-valine and 0.5 g of 3-amino-1H-1,2,4-triazole to 50 g of resin solids of the varnishes produced in the above Production Examples 4-6 and mixing them well.

Examples 97-99

Coating compositions were prepared by adding 2.5 g of L-histidine and 0.5 g of 3-amino-1H-1,2,4-triazole to 50 g of resin solids of the varnishes produced in the above Production Examples 4-6 and mixing them well.

Examples 100-102

Coating compositions were prepared by adding 2.5 g of L-phenylalanine and 0.5 g of 3-amino-1H-1,2,4-triazole to 50 g of resin solids of the varnishes produced in the above Production Examples 4-6 and mixing them well.

Examples 103-105

Coating compositions were prepared by adding 2.5 g of L-lysine and 0.5 g of 3-amino-1H-1,2,4-triazole to 50 g of resin solids of the varnishes produced in the above Production Examples 4-6 and mixing them well.

Examples 106-108

Coating compositions were prepared by adding 2.5 g of L-leucine and 0.5 g of 3-amino-1H-1,2,4-triazole to 50 g of resin solids of the varnishes produced in the above Production Examples 4-6 and mixing them well.

Examples 109-111

Coating compositions were prepared by adding 2.5 g of L-asparagine and 0.5 g of 1,2,4-triazole to 50 g of resin solids of the varnishes produced in the above Production Examples 4-6 and mixing them well.

Examples 112-114

Coating compositions were prepared by adding 2.5 g of L-alanine and 0.5 g of 1,2,4-triazole to 50 g of resin solids of the varnishes produced in the above Production Examples 4-6 and mixing them well.

Examples 115-117

Coating compositions were prepared by adding 2.5 g of glycine and 0.5 of 1,2,4-triazole to 50 g of resin solids of the varnishes produced in the above Production Examples 4-6 and mixing them well.

Examples 118-120

Coating compositions were prepared by adding 2.5 g of L-tryptophane and 0.5 g of 1,2,4-triazole to 50 g of resin solids of the varnishes produced in the above Production Examples 4-6 and mixing them well.

Examples 121–123

Coating compositions were prepared by adding 2.5 g of L-valine and 0.5 g of 1,2,4-triazole to 50 g of resin solids of the varnishes produced in the above Production Examples 4–6 and mixing them well.

Examples 124–126

Coating compositions were prepared by adding 2.5 g of L-histidine and 0.5 g of 1,2,4-triazole to 50 g of resin solids of the varnishes produced in the above Production Examples 4–6 and mixing them well.

Examples 127–129

Coating compositions were prepared by adding 2.5 g of L-phenylalanine and 0.5 g of 1,2,4-triazole to 50 g of resin solids of the varnishes produced in the above Production Examples 4–6 and mixing them well.

Examples 130–132

Coating compositions were prepared by adding 2.5 g of L-lysine and 0.5 g of 1,2,4-triazole to 50 g of resin solids of the varnishes produced in the above Production Examples 4–6 and mixing them well.

Examples 133–135

Coating compositions were prepared by adding 2.5 g of L-leucine and 0.5 of 1,2,4-triazole to 50 g of resin solids of the varnishes produced in the above Production Examples 4–6 and mixing them well.

Examples 136–138

Coating compositions were prepared by adding 2.5 g of L-asparagine and 0.5 g of 1,2,3-benzotriazole to 50 g of resins solids of the varnishes produced in the above Production Examples 4–6 and mixing them well.

Examples 139–141

Coating compositions were prepared by adding 2.5 g of L-alanine and 0.5 g of 1,2,3-benzotriazole to 50 g of resin solids of the varnishes produced in the above Production Examples 4–6 and mixing them well.

Examples 142–144

Coating compositions were prepared by adding 2.5 g of glycine and 0.5 g of 1,2,3-benzotriazole to 50 g of resin solids of the varnishes produced in the above Production Examples 4–6 and mixing them well.

Examples 145–147

Coating compositions were prepared by adding 2.5 g of L-tryptophane and 0.5 g of 1,2,3-benzotriazole to 50 g of resin solids of the varnishes produced in the above Production Examples 4–6 and mixing them well. Examples 148–150

Coating compositions were prepared by adding 2.5 g of L-valine and 0.5 g of 1,2,3-benzotriazole to 50 g of resin solids of the varnishes produced in the above Production Examples 4–6 and mixing them well.

Examples 151–153

Coating compositions were prepared by adding 2.5 g of L-histidine and 0.5 g of 1,2,3-benzotriazole to 50 g of resin solids of the varnishes produced in the above Production Examples 4–6 and mixing them well.

Examples 154–156

Coating compositions were prepared by adding 2.5 g of L-phenylalanine and 0.5 g of 1,2,3-benzotriazole to 50 g of resin solids of the varnishes produced in the above Production Examples 4–6 and mixing them well.

Examples 157–159

Coating compositions were prepared by adding 2.5 g of L-lysine and 0.5 g of 1,2,3-benzotriazole to 50 g of resin solids of the varnishes produced in the above Production Examples 4–6 and mixing them well.

Examples 160–162

Coating compositions were prepared by adding 2.5 g of L-leucine and 0.5 g of 1,2,3-benzotriazole to 50 g of resin solids of the varnishes produced in the above Production Examples 4–6 and mixing them well.

Examples 163–165

Coating compositions were prepared by adding 2.5 g of methyl lactate to 50 g of resin solids of the varnishes produced in the above Production Examples 4–6 and mixing them well.

Examples 166–168

Coating compositions were prepared by adding 2.5 g of ethyl lactate to 50 g of resin solids of the varnishes produced in the above Production Examples 4–6 and mixing them well.

Examples 169–171

Coating compositions were prepared by adding 2.5 g of methyl α-hydroxybutyrate and 0.5 g of 3-amino-1H-1,2,4-triazole to 50 g of resin solids of the varnishes produced in the above Production Examples 4–6 and mixing them well.

Examples 172–174

Coating compositions were prepared by adding 2.5 g of ethyl α-hydroxybutyrate to 50 g of resin solids of the varnishes produced in the above Production Examples 4–6 and mixing them well.

Examples 175–177

Coating compositions were prepared by adding 2.5 g of methyl lactate and 0.5 g of 3-amino-1H-1,2,4-triazole to 50 g of resin solids of the varnishes produced in the above Production Examples 4–6 and mixing them well.

Examples 178–180

Coating compositions were prepared by adding 2.5 g of ethyl lactate and 0.5 g of 3-amino-1H-1,2,4-triazole to 50 g of resin solids of the varnishes produced in the above Production Examples 4–6 and mixing them well.

Examples 181–183

Coating compositions were prepared by adding 2.5 g of methyl α-hydroxybutyrate and 0.5 g of 3-amino-1H-1,2,4-triazole to 50 g of resin solids of the varnishes produced in the above Production Examples 4–6 and mixing them well.

Examples 184–186

Coating compositions were prepared by adding 2.5 g of ethyl α-hydroxybutyrate and 0.5 g of 3-amino-1H-1,2,4-triazole to 50 g of resin solids of the varnishes produced in the above Production Examples 4–6 and mixing them well.

Examples 187–189

Coating compositions were prepared by adding 2.5 g of methyl lactate and 0.5 g of 1,2,4-triazole to 50 g of resin solids of the varnishes produced in the above Production Examples 4–6 and mixing them well.

Examples 190–192

Coating compositions were prepared by adding 2.5 g of ethyl lactate and 0.5 g of 1,2,4-triazole to 50 g of resin solids of the varnishes produced in the above Production Examples 4–6 and mixing them well.

Examples 193–195

Coating compositions were prepared by adding 2.5 g of methyl α-hydroxybutyrate and 0.5 g of 1,2,4-triazole to 50 g of resin solids of the varnishes produced in the above Production Examples 4–6 and mixing them well.

Examples 196–198

Coating compositions were prepared by adding 2.5 g of ethyl α-hydroxybutyrate and 0.5 g of 1,2,4-triazole to 50 g of resin solids of the varnishes produced in the above Production Examples 4–6 and mixing them well.

Examples 199–201

Coating compositions were prepared by adding 2.5 g of methyl lactate and 0.5 g of 1,2,3-benzotriazole to 50 g of resin solids of the varnishes produced in the above Production Examples 4–6 and mixing them well.

Examples 202–204

Coating compositions were prepared by adding 2.5 g of ethyl lactate and 0.5 g of 1,2,3-benzotriazole to 50 g of resin solids of the varnishes produced in the above Production Examples 4–6 and mixing them well.

Examples 205–207

Coating compositions were prepared by adding 2.5 g of methyl α-hydroxybutyrate and 0.5 g of 1,2,3-benzotriazole to 50 g of resin solids of the varnishes produced in the above Production Examples 4–6 and mixing them well.

Examples 208–210

Coating compositions were prepared by adding 2.5 g of ethyl α-hydroxybutyrate and 0.5 g of 1,2,3-benzotriazole to 50 g of resin solids of the varnishes produced in the above Production Examples 4–6 and mixing them well.

Example 211

A coating composition was prepared by adding 5.0 g of ethyl palmitate and 0.5 g of 1,2,3-benzotriazole to 50 g of resin solids of the varnish produced in the above Production Example 4 and mixing them well.

Example 212

A coating composition was prepared by adding 10.0 g of ethyl palmitate and 0.5 g of 1,2,3-benzotriazole to 50 g of resin solids of the varnish produced in the above Production Example 4 and mixing them well.

Example 213

A coating composition was prepared by adding 5.0 g of ethyl palmitate and 0.5 g of 1,2,3-benzotriazole to 50 g of resin solids of the varnish produced in the above Production Example 7 and mixing them well.

Example 214

A coating composition was prepared by adding 10.0 g of ethyl palmitate and 0.5 g of 1,2,3-benzotriazole to 50 g of resin solids of the varnish produced in the above Production Example 7 and mixing them well.

Example 215

A coating composition was prepared by adding 5.0 g of ethyl stearate and 0.5 g of 1,2,3-benzotriazole to 50 g of resin solids of the varnish produced in the above Production Example 4 and mixing them well.

Example 216

A coating composition was prepared by adding 10.0 g of ethyl stearate and 0.5 g of 1,2,3-benzotriazole to 50 g of resin solids of the varnish produced in the above Production Example 4 and mixing them well.

Example 217

A coating composition was prepared by adding 5.0 g of ethyl stearate and 0.5 g of 1,2,3-benzotriazole to 50 g of resin solids of the varnish produced in the above Production Example 7 and mixing them well.

Example 218

A coating composition was prepared by adding 10.0 g of ethyl stearate and 0.5 g of 1,2,3-benzotriazole to 50 g of resin solids of the varnish produced in the above Production Example 7 and mixing them well.

Example 219

A coating composition was prepared by adding 5.0 g of triphenyl phosphate and 0.5 g of 1,2,3-benzotriazole to 50 g of resin solids of the varnish procured in the above Production Example 4 and mixing them well.

Example 220

A coating composition was prepared by adding 10.0 g of triphenyl phosphate and 0.5 g of 1,2,3-benzotriazole to 50 g of resin solids of the varnish produced in the above Production Example 4 and mixing them well.

Example 221

A coating composition was prepared by adding 5.0 g of triphenyl phosphate and 0.5 g of 1,2,3-benzotriazole to 50 g of resin solids of the varnish produced in the above Production Example 7 and mixing them well.

Example 222

A coating composition was prepared by adding 10.0 g of triphenyl phosphate and 0.5 g of 1,2,3-benzotriazole to 50 g of resin solids of the varnish produced in the above Production Example 4 and mixing them well.

Example 223

A coating composition was prepared by adding 5.0 g of triphenylphosphine oxide and 0.5 g of 1,2,3-benzotriazole to 50 g of resin solids of the varnish produced in the above Production Example 4 and mixing them well.

Example 224

A coating composition was prepared by adding 10.0 g of triphenylphosphine oxide and 0.5 g of 1,2,3-benzotriazole to 50 g of resin solids of the varnish produced in the above Production Example 4 and mixing them well.

Example 225

A coating composition was prepared by adding 5.0 g of triphenylphosphine oxide and 0.5 g of 1,2,3-benzotriazole to 50 g of resin solids of the varnish produced in the above Production Example 7 and mixing them well.

Example 226

A coating composition was prepared by adding 10.0 g of triphenylphosphine oxide and 0.5 g of 1,2,3-benzotriazole to 50 g of resin solids of the varnish produced in the above Production Example 7 and mixing them well.

Example 227

A coating composition was prepared by adding 5.0 g of triphenyl phosphate, 5.0 g of ethyl stearate and 0.5 g of 1,2,3-benzotriazole to 50 g of resin solids of the varnish produced in the above Production Example 4 and mixing them well.

Example 228

A coating composition was prepared by adding 10.0 g of triphenyl phosphate, 5.0 g of ethyl stearate and 0.5 g of 1,2,3-benzotriazole to 50 g of resin solids of the varnish produced in the above Production Example 4 and mixing them well.

Example 229

A coating composition was prepared by adding 5.0 g of triphenyl phosphate, 5.0 g of ethyl stearate and 0.5 g of 1,2,3-benzotriazole to 50 g of resin solids of the varnish produced in the above Production Example 7 and mixing them well.

Example 230

A coating composition was prepared by adding 10.0 g of triphenyl phosphate, 5.0 g of ethyl stearate and 0.5 g of 1,2,3-benzotriazole to 50 g of resin solids of the varnish produced in the above Production Example 7 and mixing them well.

Example 231

A coating composition was prepared by adding 5.0 g of sodium fluorotetrasilicic mica and 0.5 g of 1,2,3-benzotriazole to 50 g of resin solids of the varnish produced in the above Production Example 4 and mixing them well.

Example 232

A coating composition was prepared by adding 10.0 g of sodium fluorotetrasilicic mica and 0.5 g of 1,2,3-benzotriazole to 50 g of resin solids of the varnish produced in the above Production Example 4 and mixing them well.

Example 233

A coating composition was prepared by adding 5.0 g of sodium fluorotetrasilicic mica and 0.5 g of 1,2,3-benzotriazole to 50 g of resin solids of the varnish produced in the above Production Example 7 and mixing them well.

Example 234

A coating composition was prepared by adding 10.0 g of sodium fluorotetrasilicic mica and 0.5 g of 1,2,3-benzotriazole to 50 g of resin solids of the varnish produced in the above Production Example 7 and mixing them well.

Example 235

A coating composition was prepared by adding 5.0 g of LUCENTITE SAN (produced by Co-op Chemical Co., Ltd.) and 0.5 g of 1,2,3-benzotriazole to 50 g of resin solids of the varnish produced in the above Production Example 4 and mixing them well.

Example 236

A coating composition was prepared by adding 10.0 g of KASEIGEL ODS-60–140 (produced by Tokyo Chemical Industry Co., Ltd.) and 0.5 g of 1,2,3-benzotriazole to 50 g of resin solids of the varnish produced in the above Production Example 4 and mixing them well.

Example 237

A coating composition was prepared by adding 5.0 g of LUCENTITE SAN (produced by Co-op Chemical Co., Ltd.) and 0.5 g of 1,2,3-benzotriazole to 50 g of resin solids of the varnish produced in the above Production Example 7 and mixing them well.

Example 238

A coating composition was prepared by adding 10.0 g of KASEIGEL ODS-60–140 (produced by Tokyo Chemical Industry Co., Ltd.) and 0.5 g of 1,2,3-benzotriazole to 50 g of resin solids of the varnish produced in the above Production Example 7 and mixing them well.

Example 239

A coating composition was prepared by adding 5.0 g of adipic acid and 0.5 g of 1,2,3-benzotriazole to 50 g of resin solids of the varnish produced in the above Production Example 4 and mixing them well.

Example 240

A coating composition was prepared by adding 5.0 g of sebacic acid and 0.5 g of 1,2,3-benzotriazole to 50 g of resin solids of the varnish produced in the above Production Example 4 and mixing them well.

Example 241

A coating composition was prepared by adding 5.0 g of adipic acid and 0.5 g of 1,2,3-benzotriazole to 50 g of resin solids of the varnish produced in the above Production Example 7 and mixing them well.

Example 242

A coating composition was prepared by adding 5.0 g of sebacic acid and 0.5 g of 1,2,3-benzotriazole to 50 g of resin solids of the varnish produced in the above Production Example 7 and mixing them well.

Examples 243–245

Coating compositions were prepared by adding 5.0 g of hexadecyl methacrylate and 0.5 g of 1,2,3-benzotriazole to 50 g of resin solids of the varnishes produced in the above Production Examples 4–6 and mixing them well.

Examples 246–248

Coating compositions were prepared by adding 5.0 g of triphenyl phosphate, 5.0 g of hexadecyl methacrylate and 0.5 g of 1,2,3-benzotriazole to 50 g of resin solids of the varnishes produced in the above Production Examples 4–6 and mixing them well.

Example 249

A coating composition was prepared by adding 5.0 g of triphenyl phosphate and 0.5 g of 1,2,3-benzotriazole to a mixture of 50 g of resin solids of the varnish produced in the above Production Example 7 and 10 g of resin solids of the varnish produced in Production Example 10 and mixing them well.

Example 250

A coating composition was prepared by adding 5.0 g of triphenyl phosphate, 5 g of polybutyl methacrylate (produced by Aldrich Chemical Co., Inc.) and 0.5 g of 1,2,3-benzotriazole to 50 g of resin solids of the varnish produced in the above Production Example 7 and mixing them well.

Examples 251–500

Antifouling coating compositions were prepared by blending 45 g of cuprous oxide (powder; purity: over 90%), 10 g of calcium carbonate, 5 g of red oxide (iron oxide (III)), 1 g of FLOWNON SP1000 (produced by Kyoei Chemical Co., Ltd.) as dispersing and anti-sagging agent, 5 g of 4,5-dichloro-2-n-octyl-4-isothiazoline-3-one and 4 g of xylene to 15 g of resin solids of the coating compositions prepared in the above Examples 1–250, further adding glass beads (diameter: 2 mm) thereto, kneading and stirring the mixture by a mechanical stirrer, and then filtering out the glass beads.

Production Example 11

A coating varnish was produced according to the method described in WO 84/02915, by feeding 114.6 g of 2,2,2-trifluoroethyl methacrylate, 14.6 g of methyl methacrylate, 20.8 g of butyl acrylate and 150 g of xylene to a 500 ml flask equipped with a thermometer and a stirrer, adding 1.5 g of AIBN as polymerization catalyst, heating the mixture at 80° C. for one hour, carrying out polymerization at 80° C. for 6 hours, and naturally cooling the resulting product in an amount of 300 g with a resin content of 50.0% by weight. The number-average molecular weight of the obtained polymer was 11,000.

Production Example 12

A coating varnish was produced according to the method described in WO 84/02915, by feeding 118.2 g of p-nitrophenyl acrylate, 13.1 g of methyl methacrylate, 18.6 g of butyl acrylate and 150 g of xylene to 500 ml flask equipped with a thermometer and a stirrer, adding 1.5 g of AIBN as polymerization catalyst, heating the mixture at 80° C. for one hour, carrying out polymerization at 80° C. for 6 hours, and naturally cooling the resulting product in an amount of 300 g with a resin content of 50.0% by weight. The number-average molecular weight of the produced polymer was 12,300.

Comparative Examples 1–9

Antifouling coating compositions were prepared by blending 45 g of cuprous oxide (powder; purity: over 90%), 10 g of calcium carbonate, 5 g of red oxide (iron oxide (III)), 1 g of FLOWNON SP1000 (produced by Kyoeisha Chemical Co., Ltd.) as dispersing and anti-sagging agent, 5 g of 4,5-dichloro-2-n-octyl-4-isothiazoline-3-one and 4 g of xylene to 15 g of resin solids of the coating varnishes produced in the above Production Examples 1–7 and 11–12, adding glass beads (diameter: 2 mm) thereto, kneading and stirring the mixture by a mechanical stirrer, and then filtering out the glass beads.

Storage Stability Test

Coating compositions prepared in the above Examples 251–500 and Comparative Examples 1–7 were kept at room temperature overnight after preparation and their viscosity at 25° C. was measured.

Each of said antifouling coating compositions was put into a sample bottle and, after stoppered, the bottle was kept in 40° C. thermostat for 20 days. Thereafter, the viscosity of the composition was measured at 25° C. The results are shown in Tables 1–26.

TABLE 1

| Antifouling coating composition | Coating composition | Change of viscosity (Pa · s) | |
|---|---|---|---|
| | | 0 day | 20 days |
| Example 251 | Example 1 | 1.2 | 4.2 |
| Example 252 | Example 2 | 3.0 | 9.1 |
| Example 253 | Example 3 | 2.7 | 8.2 |
| Example 254 | Example 4 | 1.1 | 4.0 |
| Example 255 | Example 5 | 3.0 | 9.6 |
| Example 256 | Example 6 | 2.6 | 8.4 |
| Example 257 | Example 7 | 1.2 | 3.6 |
| Example 258 | Example 8 | 2.9 | 8.4 |
| Example 259 | Example 9 | 2.6 | 7.9 |
| Example 260 | Example 10 | 1.3 | 3.7 |

TABLE 2

| Antifouling coating composition | Coating composition | Change of viscosity (Pa · s) | |
|---|---|---|---|
| | | 0 day | 20 days |
| Example 261 | Example 11 | 3.1 | 8.7 |
| Example 262 | Example 12 | 2.7 | 7.6 |
| Example 263 | Example 13 | 1.3 | 2.5 |
| Example 264 | Example 14 | 2.9 | 5.2 |
| Example 265 | Example 15 | 2.7 | 5.4 |
| Example 266 | Example 16 | 1.2 | 2.1 |
| Example 267 | Example 17 | 3.2 | 5.2 |
| Example 268 | Example 18 | 2.6 | 4.9 |
| Example 269 | Example 19 | 1.1 | 2.4 |
| Example 270 | Example 20 | 3.0 | 5.0 |

TABLE 3

| Antifouling coating composition | Coating composition | Change of viscosity (Pa·s) | |
|---|---|---|---|
| | | 0 day | 20 days |
| Example 271 | Example 21 | 2.5 | 4.8 |
| Example 272 | Example 22 | 1.4 | 2.5 |
| Example 273 | Example 23 | 2.9 | 5.0 |
| Example 274 | Example 24 | 2.6 | 5.1 |
| Example 275 | Example 25 | 1.3 | 2.4 |
| Example 276 | Example 26 | 3.1 | 5.2 |
| Example 277 | Example 27 | 2.4 | 4.7 |
| Example 278 | Example 28 | 1.3 | 2.4 |
| Example 279 | Example 29 | 2.7 | 5.2 |
| Example 280 | Example 30 | 2.7 | 5.0 |

TABLE 4

| Antifouling coating composition | Coating composition | Change of viscosity (Pa·s) | |
|---|---|---|---|
| | | 0 day | 20 days |
| Example 281 | Example 31 | 1.3 | 2.3 |
| Example 282 | Example 32 | 3.2 | 5.3 |
| Example 283 | Example 33 | 2.7 | 5.4 |
| Example 284 | Example 33 | 1.1 | 1.9 |
| Example 285 | Example 35 | 3.1 | 5.0 |
| Example 286 | Example 36 | 2.7 | 4.6 |
| Example 287 | Example 37 | 1.3 | 2.5 |
| Example 288 | Example 38 | 3.0 | 5.2 |
| Example 289 | Example 39 | 2.5 | 4.7 |
| Example 290 | Example 40 | 1.3 | 2.4 |

TABLE 5

| Antifouling coating composition | Coating composition | Change of viscosity (Pa·s) | |
|---|---|---|---|
| | | 0 day | 20 days |
| Example 291 | Example 41 | 2.9 | 5.2 |
| Example 292 | Example 42 | 2.7 | 4.8 |
| Example 293 | Example 43 | 1.2 | 2.4 |
| Example 294 | Example 44 | 3.0 | 5.1 |
| Example 295 | Example 45 | 2.7 | 5.3 |
| Example 296 | Example 46 | 1.1 | 2.1 |
| Example 297 | Example 47 | 3.0 | 5.1 |
| Example 298 | Example 48 | 2.6 | 4.4 |
| Example 299 | Example 49 | 1.2 | 2.4 |
| Example 300 | Example 50 | 2.8 | 5.0 |

TABLE 6

| Antifouling coating composition | Coating composition | Change of viscosity (Pa·s) | |
|---|---|---|---|
| | | 0 day | 20 days |
| Example 301 | Example 51 | 2.5 | 4.9 |
| Example 302 | Example 52 | 1.3 | 2.4 |
| Example 303 | Example 53 | 3.0 | 5.2 |
| Example 304 | Example 54 | 2.7 | 5.4 |
| Example 305 | Example 55 | 1.1 | 2.2 |
| Example 306 | Example 56 | 3.1 | 5.1 |
| Example 307 | Example 57 | 2.6 | 4.7 |
| Example 308 | Example 58 | 1.2 | 2.6 |
| Example 309 | Example 59 | 2.7 | 5.2 |
| Example 310 | Example 60 | 2.5 | 4.9 |

TABLE 7

| Antifouling coating composition | Coating composition | Change of viscosity (Pa·s) | |
|---|---|---|---|
| | | 0 day | 20 days |
| Example 311 | Example 61 | 1.2 | 2.6 |
| Example 312 | Example 62 | 2.8 | 5.2 |
| Example 313 | Example 63 | 2.7 | 5.4 |
| Example 314 | Example 64 | 1.2 | 2.0 |
| Example 315 | Example 65 | 3.1 | 5.2 |
| Example 316 | Example 66 | 2.6 | 8.4 |
| Example 317 | Example 67 | 3.2 | 4.6 |
| Example 318 | Example 68 | 3.3 | 4.7 |
| Example 319 | Example 69 | 3.3 | 4.8 |
| Example 320 | Example 70 | 3.3 | 4.8 |

TABLE 8

| Antifouling coating composition | Coating composition | Change of viscosity (Pa·s) | |
|---|---|---|---|
| | | 0 day | 20 days |
| Example 321 | Example 71 | 3.2 | 5.0 |
| Example 322 | Example 72 | 3.3 | 4.9 |
| Example 323 | Example 73 | 3.1 | 4.9 |
| Example 324 | Example 74 | 3.3 | 5.1 |
| Example 325 | Example 75 | 3.1 | 4.8 |
| Example 326 | Example 76 | 3.3 | 5.0 |
| Example 327 | Example 77 | 4.7 | 7.0 |
| Example 328 | Example 78 | 4.8 | 7.1 |
| Example 329 | Example 79 | 3.0 | 5.2 |
| Example 330 | Example 80 | 3.2 | 5.1 |

TABLE 9

| Antifouling coating composition | Coating composition | Change of viscosity (Pa·s) | |
|---|---|---|---|
| | | 0 day | 20 days |
| Example 331 | Example 81 | 3.2 | 5.2 |
| Example 332 | Example 82 | 1.8 | 2.8 |
| Example 333 | Example 83 | 2.5 | 4.0 |
| Example 334 | Example 84 | 3.3 | 5.2 |
| Example 335 | Example 85 | 1.8 | 2.9 |
| Example 336 | Example 86 | 2.6 | 4.3 |
| Example 337 | Example 87 | 3.4 | 5.5 |
| Example 338 | Example 88 | 1.7 | 2.8 |
| Example 339 | Example 89 | 2.5 | 3.8 |
| Example 340 | Example 90 | 3.4 | 5.1 |

TABLE 10

| Antifouling coating composition | Coating composition | Change of viscosity (Pa·s) | |
|---|---|---|---|
| | | 0 day | 20 days |
| Example 341 | Example 91 | 1.8 | 3.0 |
| Example 342 | Example 92 | 2.3 | 4.1 |
| Example 343 | Example 93 | 3.3 | 5.0 |
| Example 344 | Example 94 | 1.7 | 2.7 |
| Example 345 | Example 95 | 2.5 | 3.9 |
| Example 346 | Example 96 | 3.2 | 5.1 |
| Example 347 | Example 97 | 1.8 | 2.8 |
| Example 348 | Example 98 | 2.6 | 4.1 |
| Example 349 | Example 99 | 3.4 | 5.3 |
| Example 350 | Example 100 | 1.9 | 2.9 |

TABLE 11

| Antifouling coating composition | Coating composition | Change of viscosity (Pa · s) | |
|---|---|---|---|
| | | 0 day | 20 days |
| Example 351 | Example 101 | 2.4 | 4.0 |
| Example 352 | Example 102 | 3.3 | 5.4 |
| Example 353 | Example 103 | 1.8 | 2.8 |
| Example 354 | Example 104 | 2.6 | 4.2 |
| Example 355 | Example 105 | 3.4 | 5.4 |
| Example 356 | Example 106 | 1.8 | 2.7 |
| Example 357 | Example 107 | 2.6 | 3.9 |
| Example 358 | Example 108 | 3.3 | 5.1 |
| Example 359 | Example 109 | 1.7 | 2.8 |
| Example 360 | Example 110 | 2.5 | 4.0 |

TABLE 12

| Antifouling coating composition | Coating composition | Change of viscosity (Pa · s) | |
|---|---|---|---|
| | | 0 day | 20 days |
| Example 361 | Example 111 | 3.2 | 5.2 |
| Example 362 | Example 112 | 1.7 | 2.7 |
| Example 363 | Example 113 | 2.4 | 3.9 |
| Example 364 | Example 114 | 3.3 | 5.1 |
| Example 365 | Example 115 | 1.8 | 2.8 |
| Example 366 | Example 116 | 2.7 | 4.2 |
| Example 367 | Example 117 | 3.4 | 5.6 |
| Example 368 | Example 118 | 1.6 | 2.9 |
| Example 369 | Example 119 | 2.4 | 3.8 |
| Example 370 | Example 120 | 3.2 | 5.2 |

TABLE 13

| Antifouling coating composition | Coating composition | Change of viscosity (Pa · s) | |
|---|---|---|---|
| | | 0 day | 20 days |
| Example 371 | Example 121 | 1.9 | 3.2 |
| Example 372 | Example 122 | 2.2 | 4.0 |
| Example 373 | Example 123 | 3.1 | 4.9 |
| Example 374 | Example 124 | 1.6 | 2.7 |
| Example 375 | Example 125 | 2.6 | 3.8 |
| Example 376 | Example 126 | 3.1 | 5.1 |
| Example 377 | Example 127 | 1.8 | 2.9 |
| Example 378 | Example 128 | 2.7 | 4.0 |
| Example 379 | Example 129 | 3.5 | 5.5 |
| Example 380 | Example 130 | 1.9 | 2.8 |

TABLE 14

| Antifouling coating composition | Coating composition | Change of viscosity (Pa · s) | |
|---|---|---|---|
| | | 0 day | 20 days |
| Example 381 | Example 131 | 2.3 | 4.1 |
| Example 382 | Example 132 | 3.2 | 5.2 |
| Example 383 | Example 133 | 1.8 | 2.9 |
| Example 384 | Example 134 | 2.7 | 4.2 |
| Example 385 | Example 135 | 3.3 | 5.3 |
| Example 386 | Example 136 | 1.8 | 2.7 |
| Example 387 | Example 137 | 2.5 | 3.8 |
| Example 388 | Example 138 | 3.3 | 5.2 |
| Example 389 | Example 139 | 1.8 | 2.9 |
| Example 340 | Example 140 | 2.5 | 4.1 |

TABLE 15

| Antifouling coating composition | Coating composition | Change of viscosity (Pa · s) | |
|---|---|---|---|
| | | 0 day | 20 days |
| Example 391 | Example 141 | 3.3 | 5.3 |
| Example 392 | Example 142 | 1.6 | 2.6 |
| Example 393 | Example 143 | 2.4 | 3.8 |
| Example 394 | Example 144 | 3.4 | 5.3 |
| Example 395 | Example 145 | 2.0 | 3.0 |
| Example 396 | Example 146 | 2.9 | 4.1 |
| Example 397 | Example 147 | 3.5 | 5.1 |
| Example 398 | Example 148 | 1.8 | 2.7 |
| Example 399 | Example 149 | 2.3 | 3.8 |
| Example 400 | Example 150 | 3.1 | 5.1 |

TABLE 16

| Antifouling coating composition | Coating composition | Change of viscosity (Pa · s) | |
|---|---|---|---|
| | | 0 day | 20 days |
| Example 401 | Example 151 | 2.0 | 3.1 |
| Example 402 | Example 152 | 2.0 | 4.1 |
| Example 403 | Example 153 | 3.2 | 4.8 |
| Example 404 | Example 154 | 1.5 | 2.5 |
| Example 405 | Example 155 | 2.5 | 3.6 |
| Example 406 | Example 156 | 3.2 | 5.1 |
| Example 407 | Example 157 | 1.8 | 2.8 |
| Example 408 | Example 158 | 2.6 | 4.1 |
| Example 409 | Example 159 | 3.4 | 5.5 |
| Example 410 | Example 160 | 2.0 | 2.7 |

TABLE 17

| Antifouling coating composition | Coating composition | Change of viscosity (Pa · s) | |
|---|---|---|---|
| | | 0 day | 20 days |
| Example 411 | Example 161 | 2.2 | 4.2 |
| Example 412 | Example 162 | 3.2 | 5.1 |
| Example 413 | Example 163 | 1.5 | 9.2 |
| Example 414 | Example 164 | 2.3 | 12.9 |
| Example 415 | Example 165 | 3.2 | 17.3 |
| Example 416 | Example 166 | 1.6 | 8.7 |
| Example 417 | Example 167 | 2.3 | 10.2 |
| Example 418 | Example 168 | 3.2 | 14.3 |
| Example 419 | Example 169 | 1.6 | 8.4 |
| Example 420 | Example 170 | 2.2 | 9.5 |

TABLE 18

| Antifouling coating composition | Coating composition | Change of viscosity (Pa · s) | |
|---|---|---|---|
| | | 0 day | 20 days |
| Example 421 | Example 171 | 3.1 | 13.6 |
| Example 422 | Example 172 | 1.5 | 8.2 |
| Example 423 | Example 173 | 2.1 | 9.3 |
| Example 424 | Example 174 | 3.0 | 2.7 |
| Example 425 | Example 175 | 1.7 | 2.7 |
| Example 426 | Example 176 | 2.3 | 4.4 |
| Example 427 | Example 177 | 3.0 | 5.0 |
| Example 428 | Example 178 | 1.7 | 2.6 |
| Example 429 | Example 179 | 2.4 | 4.3 |
| Example 430 | Example 180 | 3.1 | 5.2 |

TABLE 19

| Antifouling coating composition | Coating composition | Change of viscosity (Pa.s) 0 day | 20 days |
|---|---|---|---|
| Example 431 | Example 181 | 1.7 | 2.7 |
| Example 432 | Example 182 | 2.3 | 4.1 |
| Example 433 | Example 183 | 3.1 | 5.3 |
| Example 434 | Example 184 | 1.6 | 2.7 |
| Example 435 | Example 185 | 2.4 | 4.2 |
| Example 436 | Example 186 | 3.2 | 5.1 |
| Example 437 | Example 187 | 1.6 | 2.6 |
| Example 438 | Example 188 | 2.2 | 3.9 |
| Example 439 | Example 189 | 3.1 | 5.2 |
| Example 440 | Example 190 | 1.7 | 2.7 |

TABLE 20

| Antifouling coating composition | Coating composition | Change of viscosity (Pa.s) 0 day | 20 days |
|---|---|---|---|
| Example 441 | Example 191 | 2.4 | 4.0 |
| Example 442 | Example 192 | 3.2 | 5.3 |
| Example 443 | Example 193 | 1.6 | 2.6 |
| Example 444 | Example 194 | 2.4 | 4.1 |
| Example 445 | Example 195 | 3.2 | 5.2 |
| Example 446 | Example 196 | 1.7 | 2.7 |
| Example 447 | Example 197 | 2.4 | 3.9 |
| Example 448 | Example 198 | 3.2 | 5.3 |
| Example 449 | Example 199 | 1.8 | 2.7 |
| Example 450 | Example 200 | 2.3 | 4.0 |

TABLE 21

| Antifouling coating composition | Coating composition | Change of viscosity (Pa.s) 0 day | 20 days |
|---|---|---|---|
| Example 451 | Example 201 | 3.1 | 5.1 |
| Example 452 | Example 202 | 1.7 | 2.7 |
| Example 453 | Example 203 | 2.2 | 4.0 |
| Example 454 | Example 204 | 3.2 | 5.6 |
| Example 455 | Example 205 | 1.6 | 2.7 |
| Example 456 | Example 206 | 2.4 | 4.4 |
| Example 457 | Example 207 | 3.2 | 5.4 |
| Example 458 | Example 208 | 1.6 | 2.8 |
| Example 459 | Example 209 | 2.3 | 4.0 |
| Example 460 | Example 210 | 3.0 | 5.3 |

TABLE 22

| Antifouling coating composition | Coating composition | Change of viscosity (Pa.s) 0 day | 20 days |
|---|---|---|---|
| Example 461 | Example 211 | 2.0 | 3.1 |
| Example 462 | Example 212 | 1.9 | 3.0 |
| Example 463 | Example 213 | 1.5 | 2.6 |
| Example 464 | Example 214 | 1.7 | 2.8 |
| Example 465 | Example 215 | 2.2 | 3.3 |
| Example 466 | Example 216 | 2.0 | 3.2 |
| Example 467 | Example 217 | 1.6 | 2.8 |
| Example 468 | Example 218 | 1.5 | 2.7 |
| Example 469 | Example 219 | 2.3 | 3.4 |
| Example 470 | Example 220 | 2.2 | 3.3 |

TABLE 23

| Antifouling coating composition | Coating composition | Change of viscosity (Pa.s) 0 day | 20 days |
|---|---|---|---|
| Example 471 | Example 221 | 1.8 | 2.8 |
| Example 472 | Example 222 | 1.9 | 2.9 |
| Example 473 | Example 223 | 2.2 | 3.4 |
| Example 474 | Example 224 | 2.0 | 3.1 |
| Example 475 | Example 225 | 1.5 | 2.7 |
| Example 476 | Example 226 | 1.7 | 2.9 |
| Example 477 | Example 227 | 2.3 | 3.4 |
| Example 478 | Example 228 | 2.1 | 3.2 |
| Example 479 | Example 229 | 1.7 | 2.9 |
| Example 480 | Example 230 | 1.8 | 3.0 |

TABLE 24

| Antifouling coating composition | Coating composition | Change of viscosity (Pa.s) 0 day | 20 days |
|---|---|---|---|
| Example 481 | Example 231 | 2.4 | 3.5 |
| Example 482 | Example 232 | 2.7 | 3.9 |
| Example 483 | Example 233 | 3.0 | 4.0 |
| Example 484 | Example 234 | 3.2 | 4.2 |
| Example 485 | Example 235 | 4.5 | 5.5 |
| Example 486 | Example 236 | 3.8 | 4.0 |
| Example 487 | Example 237 | 6.1 | 7.5 |
| Example 488 | Example 238 | 5.2 | 6.5 |
| Example 489 | Example 239 | 2.5 | 3.5 |
| Example 490 | Example 240 | 2.8 | 3.7 |

TABLE 25

| Antifouling coating composition | Coating composition | Change of viscosity (Pa.s) 0 day | 20 days |
|---|---|---|---|
| Example 491 | Example 241 | 3.5 | 4.5 |
| Example 492 | Example 242 | 3.6 | 4.7 |
| Example 493 | Example 243 | 1.7 | 2.6 |
| Example 494 | Example 244 | 2.4 | 3.9 |
| Example 495 | Example 245 | 3.2 | 5.0 |
| Example 496 | Example 246 | 1.6 | 2.6 |
| Example 497 | Example 247 | 2.2 | 3.8 |
| Example 498 | Example 248 | 3.3 | 5.1 |
| Example 499 | Example 249 | 1.6 | 2.5 |
| Example 500 | Example 250 | 1.7 | 2.6 |

TABLE 26

| Antifouling coating composition | Coating varnish | Change of viscosity (Pa.s) 0 day | 20 days |
|---|---|---|---|
| Comp. Example 1 | Production example 1 | 1.4 | Pudding-like |
| Comp. Example 2 | Production example 2 | 3.2 | 125.3 |
| Comp. Example 3 | Production example 3 | 3.0 | 142.5 |
| Comp. Example 4 | Production example 4 | 1.7 | 42.5 |
| Comp. Example 5 | Production example 5 | 2.4 | 53.2 |
| Comp. Example 6 | Production example 6 | 3.2 | 68.4 |

TABLE 26-continued

| Antifouling coating composition | Coating varnish | Change of viscosity (Pa.s) 0 day | 20 days |
|---|---|---|---|
| Comp. Example 7 | Production example 7 | 1.2 | 37.4 |

The above test results show that the antifouling coating compositions of this invention (Examples 251–500) suffer only a slight increase of viscosity and have excellent storage stability. On the other hand, it is seen that the antifouling coating compositions prepared in Comparative Examples 1–7 with no additive (i.e. compounds (B) and (C)) contained suffer a notable increase of viscosity and are unsuited for use as antifouling paint.

Test for ability to form coating eroded gradually during usage in the seawater

Each of the coating compositions prepared in Examples 251–500 and Comparative Examples 1–9 was left at room temperature overnight after preparation, then coated on one side of an FRP plate so that the coating thickness after dried would become 150 μm, and dried naturally at room temperature overnight. The coated FRP plate was fixed on a disc rotor plate and revolved in the seawater (temperature: 15°±2° C.) at a constant rate (about 15 knot of peripheral speed) for 10 months continuously. The coating surface was observed and the change of the coating thickness was measured. The results are shown in Tables 27–52.

TABLE 27

| Antifouling coating composition | Coating composition | Consumed coating thickness (μ/month) | | | |
|---|---|---|---|---|---|
| | | 0–1 month | 3–4 months | 6–7 months | 9–10 months |
| Example 251 | Example 1 | 9 | 8 | 7 | 7 |
| Example 252 | Example 2 | 8 | 7 | 6 | 6 |
| Example 253 | Example 3 | 9 | 7 | 7 | 6 |
| Example 254 | Example 4 | 7 | 7 | 6 | 6 |
| Example 255 | Example 5 | 8 | 7 | 7 | 6 |
| Example 256 | Example 6 | 8 | 6 | 5 | 5 |
| Example 257 | Example 7 | 7 | 5 | 5 | 5 |
| Example 258 | Example 8 | 10 | 9 | 7 | 7 |
| Example 259 | Example 9 | 9 | 7 | 7 | 6 |
| Example 260 | Example 10 | 8 | 6 | 6 | 6 |

TABLE 28

| Antifouling coating composition | Coating composition | Consumed coating thickness (μ/month) | | | |
|---|---|---|---|---|---|
| | | 0–1 month | 3–4 months | 6–7 months | 9–10 months |
| Example 261 | Example 11 | 10 | 9 | 8 | 8 |
| Example 262 | Example 12 | 9 | 9 | 8 | 7 |
| Example 263 | Example 13 | 8 | 10 | 7 | 8 |
| Example 264 | Example 14 | 8 | 9 | 9 | 7 |
| Example 265 | Example 15 | 9 | 8 | 8 | 8 |
| Example 266 | Example 16 | 7 | 8 | 8 | 7 |
| Example 267 | Example 17 | 8 | 9 | 8 | 7 |
| Example 268 | Example 18 | 8 | 8 | 8 | 7 |
| Example 269 | Example 19 | 7 | 9 | 8 | 7 |
| Example 270 | Example 20 | 9 | 9 | 9 | 8 |

TABLE 29

| Antifouling coating composition | Coating composition | Consumed coating thickness (μ/month) | | | |
|---|---|---|---|---|---|
| | | 0–1 month | 3–4 months | 6–7 months | 9–10 months |
| Example 271 | Example 21 | 8 | 8 | 8 | 7 |
| Example 272 | Example 22 | 9 | 11 | 9 | 8 |
| Example 273 | Example 23 | 8 | 10 | 9 | 7 |
| Example 274 | Example 24 | 9 | 8 | 8 | 8 |
| Example 275 | Example 25 | 7 | 8 | 8 | 7 |
| Example 276 | Example 26 | 8 | 9 | 7 | 7 |
| Example 277 | Example 27 | 8 | 9 | 9 | 8 |
| Example 278 | Example 28 | 7 | 8 | 8 | 8 |
| Example 279 | Example 29 | 10 | 12 | 9 | 9 |
| Example 280 | Example 30 | 9 | 8 | 8 | 8 |

TABLE 30

| Antifouling coating composition | Coating composition | Consumed coating thickness (μ/month) | | | |
|---|---|---|---|---|---|
| | | 0–1 month | 3–4 months | 6–7 months | 9–10 months |
| Example 281 | Example 31 | 8 | 11 | 9 | 8 |
| Example 282 | Example 32 | 9 | 10 | 8 | 8 |
| Example 283 | Example 33 | 9 | 9 | 9 | 8 |
| Example 284 | Example 34 | 7 | 8 | 8 | 7 |
| Example 285 | Example 35 | 8 | 9 | 8 | 7 |
| Example 286 | Example 36 | 8 | 9 | 8 | 8 |
| Example 287 | Example 37 | 7 | 9 | 9 | 7 |
| Example 288 | Example 38 | 10 | 10 | 9 | 8 |
| Example 289 | Example 39 | 9 | 8 | 8 | 8 |
| Example 290 | Example 40 | 7 | 8 | 8 | 8 |

TABLE 31

| Antifouling coating composition | Coating composition | Consumed coating thickness (μ/month) | | | |
|---|---|---|---|---|---|
| | | 0–1 month | 3–4 months | 6–7 months | 9–10 months |
| Example 291 | Example 41 | 9 | 9 | 9 | 8 |
| Example 292 | Example 42 | 9 | 8 | 8 | 8 |
| Example 293 | Example 43 | 8 | 10 | 9 | 8 |
| Example 294 | Example 44 | 8 | 9 | 9 | 7 |
| Example 295 | Example 45 | 9 | 9 | 9 | 8 |
| Example 296 | Example 46 | 7 | 8 | 8 | 7 |
| Example 297 | Example 47 | 8 | 9 | 8 | 7 |
| Example 298 | Example 48 | 8 | 9 | 8 | 8 |
| Example 299 | Example 49 | 7 | 9 | 9 | 8 |
| Example 300 | Example 50 | 10 | 10 | 9 | 8 |

TABLE 32

| Antifouling coating composition | Coating composition | Consumed coating thickness (μ/month) | | | |
|---|---|---|---|---|---|
| | | 0–1 month | 3–4 months | 6–7 months | 9–10 months |
| Example 301 | Example 51 | 9 | 8 | 7 | 8 |
| Example 302 | Example 52 | 9 | 9 | 8 | 8 |
| Example 303 | Example 53 | 8 | 8 | 8 | 7 |
| Example 304 | Example 54 | 9 | 9 | 8 | 7 |
| Example 305 | Example 55 | 7 | 8 | 8 | 7 |
| Example 306 | Example 56 | 8 | 8 | 8 | 8 |
| Example 307 | Example 57 | 8 | 9 | 8 | 8 |
| Example 308 | Example 58 | 8 | 9 | 8 | 7 |

TABLE 32-continued

| Antifouling coating composition | Coating composition | Consumed coating thickness (μ/month) | | | |
|---|---|---|---|---|---|
| | | 0–1 month | 3–4 months | 6–7 months | 9–10 months |
| Example 309 | Example 59 | 7 | 9 | 9 | 8 |
| Example 310 | Example 60 | 8 | 8 | 7 | 8 |

TABLE 33

| Antifouling coating composition | Coating composition | Consumed coating thickness (μ/month) | | | |
|---|---|---|---|---|---|
| | | 0–1 month | 3–4 months | 6–7 months | 9–10 months |
| Example 311 | Example 61 | 10 | 11 | 8 | 8 |
| Example 312 | Example 62 | 8 | 8 | 8 | 7 |
| Example 313 | Example 63 | 9 | 8 | 8 | 8 |
| Example 314 | Example 64 | 7 | 8 | 8 | 7 |
| Example 315 | Example 65 | 8 | 9 | 7 | 7 |
| Example 316 | Example 66 | 8 | 9 | 8 | 7 |
| Example 317 | Example 67 | 10 | 10 | 9 | 9 |
| Example 318 | Example 68 | 9 | 10 | 10 | 9 |
| Example 319 | Example 69 | 9 | 9 | 9 | 9 |
| Example 320 | Example 70 | 9 | 9 | 10 | 9 |

TABLE 34

| Antifouling coating composition | Coating composition | Consumed coating thickness (μ/month) | | | |
|---|---|---|---|---|---|
| | | 0–1 month | 3–4 months | 6–7 months | 9–10 months |
| Example 321 | Example 71 | 10 | 10 | 10 | 10 |
| Example 322 | Example 72 | 10 | 9 | 8 | 9 |
| Example 323 | Example 73 | 9 | 10 | 10 | 9 |
| Example 324 | Example 74 | 9 | 10 | 10 | 9 |
| Example 325 | Example 75 | 10 | 10 | 9 | 10 |
| Example 326 | Example 76 | 10 | 9 | 9 | 9 |
| Example 327 | Example 77 | 9 | 10 | 10 | 10 |
| Example 328 | Example 78 | 9 | 10 | 10 | 9 |
| Example 329 | Example 79 | 9 | 9 | 10 | 9 |
| Example 330 | Example 80 | 9 | 10 | 9 | 10 |

TABLE 35

| Antifouling coating composition | Coating composition | Consumed coating thickness (μ/month) | | | |
|---|---|---|---|---|---|
| | | 0–1 month | 3–4 months | 6–7 months | 9–10 months |
| Example 331 | Example 81 | 8 | 10 | 9 | 9 |
| Example 332 | Example 82 | 10 | 11 | 9 | 8 |
| Example 333 | Example 83 | 9 | 10 | 9 | 7 |
| Example 334 | Example 84 | 9 | 10 | 9 | 8 |
| Example 335 | Example 85 | 8 | 9 | 9 | 7 |
| Example 336 | Example 86 | 8 | 10 | 10 | 8 |
| Example 337 | Example 87 | 8 | 10 | 9 | 8 |
| Example 338 | Example 88 | 8 | 10 | 9 | 8 |
| Example 339 | Example 89 | 10 | 11 | 9 | 9 |
| Example 340 | Example 90 | 9 | 9 | 9 | 8 |

TABLE 36

| Antifouling coating composition | Coating composition | Consumed coating thickness (μ/month) | | | |
|---|---|---|---|---|---|
| | | 0–1 month | 3–4 months | 6–7 months | 9–10 months |
| Example 341 | Example 91 | 9 | 10 | 9 | 8 |
| Example 342 | Example 92 | 8 | 10 | 8 | 7 |
| Example 343 | Example 93 | 9 | 10 | 8 | 8 |
| Example 344 | Example 94 | 7 | 10 | 9 | 9 |
| Example 345 | Example 95 | 8 | 9 | 9 | 9 |
| Example 346 | Example 96 | 8 | 9 | 9 | 8 |
| Example 347 | Example 97 | 7 | 10 | 9 | 9 |
| Example 348 | Example 98 | 10 | 12 | 9 | 8 |
| Example 349 | Example 99 | 9 | 10 | 9 | 9 |
| Example 350 | Example 100 | 9 | 11 | 8 | 9 |

TABLE 37

| Antifouling coating composition | Coating composition | Consumed coating thickness (μm/month) | | | |
|---|---|---|---|---|---|
| | | 0–1 month | 3–4 months | 6–7 months | 9–10 months |
| Example 351 | Example 101 | 8 | 10 | 8 | 8 |
| Example 352 | Example 102 | 9 | 10 | 9 | 9 |
| Example 353 | Example 103 | 7 | 9 | 9 | 8 |
| Example 354 | Example 104 | 8 | 9 | 9 | 9 |
| Example 355 | Example 105 | 8 | 9 | 9 | 8 |
| Example 356 | Example 106 | 7 | 9 | 8 | 7 |
| Example 357 | Example 107 | 10 | 10 | 9 | 8 |
| Example 358 | Example 108 | 9 | 9 | 9 | 8 |
| Example 359 | Example 109 | 7 | 9 | 8 | 7 |
| Example 360 | Example 110 | 10 | 9 | 9 | 9 |

TABLE 38

| Antifouling coating composition | Coating composition | Consumed coating thickness (μm/month) | | | |
|---|---|---|---|---|---|
| | | 0–1 month | 3–4 months | 6–7 months | 9–10 months |
| Example 361 | Example 111 | 9 | 9 | 9 | 8 |
| Example 362 | Example 112 | 9 | 10 | 10 | 8 |
| Example 363 | Example 113 | 8 | 0 | 9 | 8 |
| Example 364 | Example 114 | 9 | 9 | 8 | 8 |
| Example 365 | Example 115 | 8 | 9 | 8 | 8 |
| Example 366 | Example 116 | 8 | 9 | 8 | 8 |
| Example 367 | Example 117 | 8 | 9 | 8 | 9 |
| Example 368 | Example 118 | 8 | 8 | 8 | 7 |
| Example 369 | Example 119 | 9 | 10 | 9 | 8 |
| Example 370 | Example 120 | 9 | 8 | 8 | 8 |

TABLE 39

| Antifouling coating composition | Coating composition | Consumed coating thickness (μm/month) | | | |
|---|---|---|---|---|---|
| | | 0–1 month | 3–4 months | 6–7 months | 9–10 months |
| Example 371 | Example 121 | 9 | 10 | 8 | 8 |
| Example 372 | Example 122 | 8 | 10 | 8 | 7 |
| Example 373 | Example 123 | 9 | 10 | 9 | 8 |
| Example 374 | Example 124 | 7 | 9 | 9 | 8 |
| Example 375 | Example 125 | 8 | 10 | 8 | 7 |
| Example 376 | Example 126 | 8 | 9 | 9 | 9 |
| Example 377 | Example 127 | 7 | 8 | 8 | 7 |
| Example 378 | Example 128 | 10 | 11 | 9 | 8 |

TABLE 39-continued

| Antifouling coating composition | Coating composition | Consumed coating thickness (μm/month) | | | |
|---|---|---|---|---|---|
| | | 0-1 month | 3-4 months | 6-7 months | 9-10 months |
| Example 379 | Example 129 | 9 | 10 | 9 | 8 |
| Example 380 | Example 130 | 9 | 9 | 8 | 8 |

TABLE 40

| Antifouling coating composition | Coating composition | Consumed coating thickness (μm/month) | | | |
|---|---|---|---|---|---|
| | | 0-1 month | 3-4 months | 6-7 months | 9-10 months |
| Example 381 | Example 131 | 8 | 11 | 10 | 7 |
| Example 382 | Example 132 | 9 | 9 | 9 | 8 |
| Example 383 | Example 133 | 7 | 8 | 8 | 8 |
| Example 384 | Example 134 | 9 | 9 | 8 | 8 |
| Example 385 | Example 135 | 8 | 9 | 9 | 8 |
| Example 386 | Example 136 | 7 | 8 | 8 | 8 |
| Example 387 | Example 137 | 10 | 12 | 9 | 9 |
| Example 388 | Example 138 | 9 | 9 | 8 | 8 |
| Example 389 | Example 139 | 8 | 9 | 9 | 7 |
| Example 390 | Example 140 | 10 | 10 | 9 | 8 |

TABLE 41

| Antifouling coating composition | Coating composition | Consumed coating thickness (μm/month) | | | |
|---|---|---|---|---|---|
| | | 0-1 month | 3-4 months | 6-7 months | 9-10 months |
| Example 391 | Example 141 | 9 | 10 | 9 | 8 |
| Example 392 | Example 142 | 9 | 11 | 9 | 8 |
| Example 393 | Example 143 | 8 | 10 | 9 | 8 |
| Example 394 | Example 144 | 9 | 9 | 9 | 8 |
| Example 395 | Example 145 | 7 | 8 | 8 | 7 |
| Example 396 | Example 146 | 8 | 9 | 8 | 7 |
| Example 397 | Example 147 | 8 | 9 | 9 | 8 |
| Example 398 | Example 148 | 8 | 9 | 9 | 8 |
| Example 399 | Example 149 | 10 | 10 | 9 | 8 |
| Example 400 | Example 150 | 9 | 9 | 8 | 8 |

TABLE 42

| Antifouling coating composition | Coating composition | Consumed coating thickness (μm/month) | | | |
|---|---|---|---|---|---|
| | | 0-1 month | 3-4 months | 6-7 months | 9-10 months |
| Example 401 | Example 151 | 9 | 11 | 9 | 8 |
| Example 402 | Example 152 | 8 | 10 | 8 | 8 |
| Example 403 | Example 153 | 9 | 10 | 9 | 8 |
| Example 404 | Example 154 | 7 | 8 | 9 | 8 |
| Example 405 | Example 155 | 8 | 8 | 8 | 8 |
| Example 406 | Example 156 | 8 | 9 | 8 | 8 |
| Example 407 | Example 157 | 7 | 9 | 8 | 8 |
| Example 408 | Example 158 | 9 | 9 | 8 | 8 |
| Example 409 | Example 159 | 9 | 9 | 9 | 8 |
| Example 410 | Example 160 | 9 | 10 | 8 | 8 |

TABLE 43

| Antifouling coating composition | Coating composition | Consumed coating thickness (μm/month) | | | |
|---|---|---|---|---|---|
| | | 0-1 month | 3-4 months | 6-7 months | 9-10 months |
| Example 411 | Example 161 | 8 | 10 | 8 | 7 |
| Example 412 | Example 162 | 9 | 10 | 9 | 8 |
| Example 413 | Example 163 | 6 | 7 | 7 | 7 |
| Example 414 | Example 164 | 5 | 6 | 7 | 7 |
| Example 415 | Example 165 | 6 | 6 | 6 | 5 |
| Example 416 | Example 166 | 6 | 7 | 7 | 7 |
| Example 417 | Example 167 | 5 | 6 | 7 | 7 |
| Example 418 | Example 168 | 6 | 6 | 6 | 5 |
| Example 419 | Example 169 | 6 | 6 | 6 | 7 |
| Example 420 | Example 170 | 5 | 6 | 6 | 7 |

TABLE 44

| Antifouling coating composition | Coating composition | Consumed coating thickness (μm/month) | | | |
|---|---|---|---|---|---|
| | | 0-1 month | 3-4 months | 6-7 months | 9-10 months |
| Example 421 | Example 171 | 5 | 6 | 6 | 5 |
| Example 422 | Example 172 | 6 | 7 | 6 | 7 |
| Example 423 | Example 173 | 5 | 6 | 7 | 7 |
| Example 424 | Example 174 | 6 | 6 | 6 | 5 |
| Example 425 | Example 175 | 9 | 9 | 9 | 7 |
| Example 426 | Example 176 | 8 | 9 | 9 | 8 |
| Example 427 | Example 177 | 8 | 9 | 9 | 8 |
| Example 428 | Example 178 | 8 | 10 | 8 | 8 |
| Example 429 | Example 179 | 10 | 10 | 9 | 9 |
| Example 430 | Example 180 | 9 | 9 | 9 | 8 |

TABLE 45

| Antifouling coating composition | Coating composition | Consumed coating thickness (μm/month) | | | |
|---|---|---|---|---|---|
| | | 0-1 month | 3-4 months | 6-7 months | 9-10 months |
| Example 431 | Example 181 | 8 | 11 | 9 | 8 |
| Example 432 | Example 182 | 9 | 10 | 8 | 8 |
| Example 433 | Example 183 | 9 | 9 | 9 | 8 |
| Example 434 | Example 184 | 8 | 9 | 8 | 8 |
| Example 435 | Example 185 | 8 | 9 | 8 | 8 |
| Example 436 | Example 186 | 8 | 9 | 9 | 8 |
| Example 437 | Example 187 | 8 | 9 | 9 | 7 |
| Example 438 | Example 188 | 10 | 10 | 9 | 8 |
| Example 439 | Example 189 | 9 | 8 | 8 | 8 |
| Example 440 | Example 190 | 9 | 8 | 8 | 8 |

TABLE 46

| Antifouling coating composition | Coating composition | Consumed coating thickness (μm/month) | | | |
|---|---|---|---|---|---|
| | | 0-1 month | 3-4 months | 6-7 months | 9-10 months |
| Example 441 | Example 191 | 9 | 9 | 9 | 8 |
| Example 442 | Example 192 | 9 | 8 | 8 | 8 |
| Example 443 | Example 193 | 8 | 9 | 9 | 8 |
| Example 444 | Example 194 | 9 | 10 | 9 | 7 |
| Example 445 | Example 195 | 8 | 9 | 9 | 8 |
| Example 446 | Example 196 | 8 | 8 | 8 | 7 |
| Example 447 | Example 197 | 8 | 8 | 8 | 7 |
| Example 448 | Example 198 | 8 | 9 | 8 | 8 |

TABLE 46-continued

| Antifouling coating composition | Coating composition | Consumed coating thickness (μm/month) | | | |
|---|---|---|---|---|---|
| | | 0–1 month | 3–4 months | 6–7 months | 9–10 months |
| Example 449 | Example 199 | 8 | 10 | 9 | 8 |
| Example 450 | Example 200 | 10 | 10 | 9 | 8 |

TABLE 47

| Antifouling coating composition | Coating composition | Consumed coating thickness (μm/month) | | | |
|---|---|---|---|---|---|
| | | 0–1 month | 3–4 months | 6–7 months | 9–10 months |
| Example 451 | Example 201 | 9 | 8 | 9 | 8 |
| Example 452 | Example 202 | 9 | 9 | 8 | 8 |
| Example 453 | Example 203 | 8 | 9 | 9 | 7 |
| Example 454 | Example 204 | 8 | 9 | 9 | 7 |
| Example 455 | Example 205 | 7 | 8 | 8 | 7 |
| Example 456 | Example 206 | 8 | 9 | 9 | 8 |
| Example 457 | Example 207 | 8 | 9 | 9 | 8 |
| Example 458 | Example 208 | 8 | 8 | 8 | 7 |
| Example 459 | Example 209 | 7 | 9 | 9 | 8 |
| Example 460 | Example 210 | 8 | 9 | 9 | 8 |

TABLE 48

| Antifouling coating composition | Coating composition | Consumed coating thickness (μm/month) | | | |
|---|---|---|---|---|---|
| | | 0–1 month | 3–4 months | 6–7 months | 9–10 months |
| Example 461 | Example 211 | 9 | 10 | 10 | 8 |
| Example 462 | Example 212 | 8 | 11 | 10 | 8 |
| Example 463 | Example 213 | 9 | 10 | 10 | 10 |
| Example 464 | Example 214 | 9 | 10 | 10 | 10 |
| Example 465 | Example 215 | 9 | 10 | 10 | 9 |
| Example 466 | Example 216 | 8 | 11 | 10 | 10 |
| Example 467 | Example 217 | 8 | 10 | 11 | 11 |
| Example 468 | Example 218 | 8 | 10 | 12 | 12 |
| Example 469 | Example 219 | 10 | 9 | 10 | 10 |
| Example 470 | Example 220 | 10 | 10 | 10 | 10 |

TABLE 49

| Antifouling coating composition | Coating composition | Consumed coating thickness (μm/month) | | | |
|---|---|---|---|---|---|
| | | 0–1 month | 3–4 months | 6–7 months | 9–10 months |
| Example 471 | Example 221 | 11 | 10 | 9 | 10 |
| Example 472 | Example 222 | 10 | 11 | 10 | 9 |
| Example 473 | Example 223 | 11 | 10 | 10 | 9 |
| Example 474 | Example 224 | 10 | 9 | 10 | 11 |
| Example 475 | Example 225 | 10 | 9 | 10 | 10 |
| Example 476 | Example 226 | 11 | 10 | 11 | 11 |
| Example 477 | Example 227 | 10 | 9 | 10 | 10 |
| Example 478 | Example 228 | 11 | 10 | 11 | 10 |
| Example 479 | Example 229 | 11 | 10 | 10 | 10 |
| Example 480 | Example 230 | 10 | 10 | 11 | 10 |

TABLE 50

| Antifouling coating composition | Coating composition | Consumed coating thickness (μm/month) | | | |
|---|---|---|---|---|---|
| | | 0–1 month | 3–4 months | 6–7 months | 9–10 months |
| Example 481 | Example 231 | 9 | 9 | 10 | 8 |
| Example 482 | Example 232 | 8 | 10 | 9 | 8 |
| Example 483 | Example 233 | 9 | 11 | 11 | 10 |
| Example 484 | Example 234 | 8 | 10 | 10 | 9 |
| Example 485 | Example 235 | 9 | 9 | 9 | 9 |
| Example 486 | Example 236 | 8 | 9 | 9 | 8 |
| Example 487 | Example 237 | 9 | 10 | 10 | 10 |
| Example 488 | Example 238 | 8 | 10 | 9 | 9 |
| Example 489 | Example 239 | 9 | 9 | 9 | 9 |
| Example 490 | Example 240 | 8 | 9 | 9 | 9 |

TABLE 51

| Antifouling coating composition | Coating composition | Consumed coating thickness (μm/month) | | | |
|---|---|---|---|---|---|
| | | 0–1 month | 3–4 months | 6–7 months | 9–10 months |
| Example 491 | Example 241 | 9 | 9 | 10 | 10 |
| Example 492 | Example 242 | 9 | 10 | 10 | 9 |
| Example 493 | Example 243 | 8 | 8 | 8 | 8 |
| Example 494 | Example 244 | 8 | 9 | 8 | 8 |
| Example 495 | Example 245 | 8 | 8 | 8 | 8 |
| Example 496 | Example 246 | 10 | 10 | 9 | 10 |
| Example 497 | Example 247 | 10 | 9 | 10 | 10 |
| Example 498 | Example 248 | 10 | 10 | 11 | 10 |
| Example 499 | Example 249 | 10 | 11 | 10 | 10 |
| Example 500 | Example 250 | 10 | 10 | 11 | 10 |

TABLE 52

| Antifouling coating composition | Coating varnish | Consumed coating thickness (μm/month) | | | |
|---|---|---|---|---|---|
| | | 0–1 month | 3–4 months | 6–7 months | 9–10 months |
| Comp. Example 1 | Production Example 1 | 0 | 0 | 0 | 0 |
| Comp. Example 2 | Production Example 2 | 1 | 1 | 0 | 0 |
| Comp. Example 3 | Production Example 3 | 1 | 1 | 1 | 1 |
| Comp. Example 4 | Production Example 4 | 1 | 1 | 0 | 0 |
| Comp. Example 5 | Production Example 5 | 1 | 0 | 0 | 0 |
| Comp. Example 6 | Production Example 6 | 1 | 1 | 0 | 0 |
| Comp. Example 7 | Production Example 7 | 0 | 0 | 0 | 0 |
| Comp. Example 8 | Production Example 11 | 1 | 1 | 1 | 1 |
| Comp. Example 9 | Production Example 12 | 1 | 2 | 1 | 1 |

As is clear from the above test results, the antifouling coating compositions of the present invention (Examples 251–500) can maintain appropriate constant ability to form coating eroded gradually during usage in the seawater for a long time and are very useful as antifouling paint. In contrast, the coating compositions prepared in Comparative Examples 1–7 with no additive (i.e. compounds (B) and (C)) contained are very low in ability to form coating eroded gradually. The antifouling coating compositions using the varnish disclosed in WO 84/02915 (Comparative Examples 8 and 9) are also very low in ability to form coating eroded gradually rate.

Antifouling Test

Each of the antifouling coating compositions of Examples 251–500 and Comparative Examples 8 and 9 was spray coated twice on both sides of a steel plate (100×200×1 mm), which had previously been coated with an anti-corrosive paint, so that the coating thickness of one side after dried would become 100 μm, and naturally dried at room temperature overnight to make a test plate.

This test plate was fixed to a raft placed in the Nakamitano Port of Hitachinake-shi, Ibaraki-ken, Japan, and dipped in the seawater. The number of the organisms (barnacles) attached to the test plate was counted periodically. The results are shown in Tables 53–78.

TABLE 53

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 251 | Example 1 | 0 | 4 | 6 | 10 | 15 |
| Example 252 | Example 2 | 0 | 1 | 2 | 7 | 10 |
| Example 253 | Example 3 | 0 | 2 | 3 | 5 | 9 |
| Example 254 | Example 4 | 0 | 4 | 8 | 9 | 10 |
| Example 255 | Example 5 | 0 | 2 | 3 | 5 | 8 |
| Example 256 | Example 6 | 0 | 4 | 7 | 10 | 11 |
| Example 257 | Example 7 | 0 | 2 | 3 | 6 | 7 |
| Example 258 | Example 8 | 0 | 1 | 2 | 5 | 6 |
| Example 259 | Example 9 | 0 | 0 | 2 | 3 | 5 |
| Example 260 | Example 10 | 0 | 4 | 7 | 9 | 12 |

TABLE 54

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 261 | Example 11 | 0 | 1 | 2 | 6 | 7 |
| Example 262 | Example 12 | 0 | 2 | 3 | 4 | 7 |
| Example 263 | Example 13 | 0 | 1 | 1 | 2 | 3 |
| Example 264 | Example 14 | 0 | 0 | 1 | 2 | 2 |
| Example 265 | Example 15 | 0 | 0 | 1 | 2 | 2 |
| Example 266 | Example 16 | 0 | 0 | 1 | 2 | 3 |
| Example 267 | Example 17 | 0 | 0 | 1 | 2 | 4 |
| Example 268 | Example 18 | 0 | 1 | 1 | 2 | 4 |
| Example 269 | Example 19 | 0 | 0 | 1 | 2 | 3 |
| Example 270 | Example 20 | 0 | 1 | 1 | 2 | 4 |

TABLE 55

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 271 | Example 21 | 0 | 2 | 3 | 3 | 4 |
| Example 272 | Example 22 | 0 | 1 | 1 | 2 | 3 |
| Example 273 | Example 23 | 0 | 0 | 1 | 2 | 3 |
| Example 274 | Example 24 | 0 | 0 | 1 | 2 | 2 |
| Example 275 | Example 25 | 0 | 1 | 2 | 2 | 4 |
| Example 276 | Example 26 | 0 | 1 | 3 | 3 | 4 |
| Example 277 | Example 27 | 0 | 0 | 1 | 2 | 3 |
| Example 278 | Example 28 | 0 | 0 | 1 | 2 | 3 |
| Example 279 | Example 29 | 0 | 1 | 1 | 2 | 4 |
| Example 280 | Example 30 | 0 | 1 | 3 | 3 | 4 |

TABLE 56

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 281 | Example 31 | 0 | 0 | 1 | 2 | 15 |
| Example 282 | Example 32 | 0 | 1 | 1 | 2 | 2 |
| Example 283 | Example 33 | 0 | 0 | 1 | 2 | 2 |
| Example 284 | Example 34 | 0 | 1 | 2 | 2 | 4 |
| Example 285 | Example 35 | 0 | 1 | 1 | 2 | 4 |
| Example 286 | Example 36 | 0 | 1 | 2 | 2 | 3 |
| Example 287 | Example 37 | 0 | 1 | 2 | 2 | 3 |
| Example 288 | Example 38 | 0 | 1 | 2 | 2 | 4 |
| Example 289 | Example 39 | 0 | 1 | 3 | 3 | 4 |
| Example 290 | Example 40 | 0 | 0 | 1 | 2 | 3 |

TABLE 57

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 291 | Example 41 | 0 | 1 | 1 | 2 | 4 |
| Example 292 | Example 42 | 0 | 1 | 3 | 3 | 4 |
| Example 293 | Example 43 | 0 | 0 | 2 | 2 | 3 |
| Example 294 | Example 44 | 0 | 1 | 2 | 2 | 2 |
| Example 295 | Example 45 | 0 | 0 | 1 | 1 | 2 |
| Example 296 | Example 46 | 0 | 1 | 2 | 2 | 4 |
| Example 297 | Example 47 | 0 | 1 | 2 | 2 | 4 |
| Example 298 | Example 48 | 0 | 1 | 1 | 3 | 3 |
| Example 399 | Example 49 | 0 | 1 | 2 | 2 | 3 |
| Example 300 | Example 50 | 0 | 1 | 2 | 2 | 3 |

TABLE 58

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 301 | Example 51 | 0 | 1 | 3 | 3 | 4 |
| Example 302 | Example 52 | 0 | 0 | 1 | 3 | 5 |
| Example 303 | Example 53 | 0 | 1 | 1 | 2 | 2 |
| Example 304 | Example 54 | 0 | 0 | 2 | 2 | 2 |
| Example 305 | Example 55 | 0 | 1 | 2 | 2 | 4 |
| Example 306 | Example 56 | 0 | 0 | 2 | 2 | 4 |
| Example 307 | Example 57 | 0 | 1 | 1 | 2 | 3 |
| Example 308 | Example 58 | 0 | 1 | 2 | 2 | 4 |
| Example 309 | Example 59 | 0 | 1 | 1 | 2 | 3 |
| Example 310 | Example 60 | 0 | 1 | 2 | 2 | 4 |

TABLE 59

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 311 | Example 61 | 0 | 0 | 1 | 2 | 3 |
| Example 312 | Example 62 | 0 | 1 | 1 | 2 | 3 |
| Example 313 | Example 63 | 0 | 0 | 1 | 2 | 2 |

TABLE 59-continued

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 314 | Example 64 | 0 | 1 | 2 | 2 | 4 |
| Example 315 | Example 65 | 0 | 0 | 2 | 2 | 4 |
| Example 316 | Example 66 | 0 | 0 | 1 | 2 | 3 |
| Example 317 | Example 67 | 0 | 0 | 0 | 0 | 0 |
| Example 318 | Example 68 | 0 | 0 | 0 | 1 | 1 |
| Example 319 | Example 69 | 0 | 0 | 0 | 0 | 0 |
| Example 320 | Example 70 | 0 | 0 | 0 | 0 | 1 |

TABLE 60

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 321 | Example 71 | 0 | 0 | 0 | 1 | 1 |
| Example 322 | Example 72 | 0 | 0 | 0 | 0 | 1 |
| Example 323 | Example 73 | 0 | 0 | 0 | 0 | 1 |
| Example 324 | Example 74 | 0 | 0 | 0 | 0 | 0 |
| Example 325 | Example 75 | 0 | 0 | 1 | 1 | 1 |
| Example 326 | Example 76 | 0 | 0 | 0 | 0 | 0 |
| Example 327 | Example 77 | 0 | 0 | 1 | 2 | 2 |
| Example 328 | Example 78 | 0 | 1 | 2 | 2 | 4 |
| Example 329 | Example 79 | 0 | 0 | 2 | 2 | 4 |
| Example 330 | Example 80 | 0 | 0 | 1 | 2 | 3 |

TABLE 61

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 331 | Example 81 | 0 | 0 | 0 | 0 | 1 |
| Example 332 | Example 82 | 0 | 0 | 1 | 2 | 3 |
| Example 333 | Example 83 | 0 | 1 | 2 | 2 | 2 |
| Example 334 | Example 84 | 0 | 0 | 2 | 2 | 2 |
| Example 335 | Example 85 | 0 | 0 | 1 | 2 | 4 |
| Example 336 | Example 86 | 0 | 1 | 1 | 2 | 4 |

TABLE 61-continued

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 337 | Example 87 | 0 | 0 | 1 | 2 | 3 |
| Example 338 | Example 88 | 0 | 0 | 1 | 2 | 3 |
| Example 339 | Example 89 | 0 | 1 | 2 | 3 | 4 |
| Example 340 | Example 90 | 0 | 1 | 2 | 3 | 4 |

TABLE 62

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 341 | Example 91 | 0 | 0 | 2 | 2 | 3 |
| Example 342 | Example 92 | 0 | 0 | 1 | 2 | 3 |
| Example 343 | Example 93 | 0 | 0 | 1 | 2 | 3 |
| Example 344 | Example 94 | 0 | 1 | 1 | 2 | 3 |
| Example 345 | Example 95 | 0 | 1 | 2 | 2 | 3 |
| Example 346 | Example 96 | 0 | 1 | 2 | 2 | 3 |
| Example 347 | Example 97 | 0 | 0 | 2 | 2 | 3 |
| Example 348 | Example 98 | 0 | 1 | 2 | 3 | 4 |
| Example 349 | Example 99 | 0 | 0 | 3 | 3 | 4 |
| Example 350 | Example 100 | 0 | 0 | 1 | 1 | 3 |

TABLE 63

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 351 | Example 101 | 0 | 0 | 1 | 2 | 2 |
| Example 352 | Example 102 | 0 | 0 | 1 | 2 | 2 |
| Example 353 | Example 103 | 0 | 0 | 1 | 2 | 4 |
| Example 354 | Example 104 | 0 | 1 | 2 | 2 | 4 |
| Example 355 | Example 105 | 0 | 1 | 1 | 2 | 3 |
| Example 356 | Example 106 | 0 | 0 | 1 | 2 | 3 |
| Example 357 | Example 107 | 0 | 1 | 2 | 4 | 4 |
| Example 358 | Example 108 | 0 | 0 | 2 | 2 | 4 |

TABLE 63-continued

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 359 | Example 109 | 0 | 0 | 2 | 3 | 3 |
| Example 360 | Example 110 | 0 | 0 | 2 | 2 | 4 |

TABLE 64

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 361 | Example 111 | 0 | 0 | 2 | 2 | 3 |
| Example 362 | Example 112 | 0 | 0 | 0 | 1 | 3 |
| Example 363 | Example 113 | 0 | 0 | 1 | 2 | 2 |
| Example 364 | Example 114 | 0 | 0 | 2 | 2 | 2 |
| Example 365 | Example 115 | 0 | 1 | 1 | 2 | 4 |
| Example 366 | Example 116 | 0 | 1 | 3 | 3 | 4 |
| Example 367 | Example 117 | 0 | 0 | 1 | 2 | 3 |
| Example 368 | Example 118 | 0 | 0 | 1 | 2 | 3 |
| Example 369 | Example 119 | 0 | 1 | 1 | 2 | 4 |
| Example 370 | Example 120 | 0 | 1 | 3 | 3 | 3 |

TABLE 65

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 371 | Example 121 | 0 | 0 | 1 | 2 | 3 |
| Example 372 | Example 122 | 0 | 0 | 1 | 2 | 2 |
| Example 373 | Example 123 | 0 | 0 | 1 | 2 | 4 |
| Example 374 | Example 124 | 0 | 0 | 1 | 2 | 4 |
| Example 375 | Example 125 | 0 | 1 | 1 | 2 | 4 |
| Example 376 | Example 126 | 0 | 0 | 1 | 2 | 3 |
| Example 377 | Example 127 | 0 | 0 | 1 | 3 | 3 |
| Example 378 | Example 128 | 0 | 0 | 2 | 2 | 4 |
| Example 379 | Example 129 | 0 | 0 | 2 | 2 | 2 |
| Example 380 | Example 130 | 0 | 0 | 1 | 1 | 3 |

TABLE 66

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 381 | Example 131 | 0 | 1 | 2 | 2 | 2 |
| Example 382 | Example 132 | 0 | 0 | 2 | 2 | 3 |
| Example 383 | Example 133 | 0 | 0 | 1 | 2 | 4 |
| Example 384 | Example 134 | 0 | 0 | 1 | 2 | 4 |
| Example 385 | Example 135 | 0 | 0 | 1 | 2 | 3 |
| Example 386 | Example 136 | 0 | 0 | 2 | 2 | 2 |
| Example 387 | Example 137 | 0 | 0 | 1 | 1 | 4 |
| Example 388 | Example 138 | 0 | 1 | 3 | 3 | 4 |
| Example 389 | Example 139 | 0 | 0 | 1 | 2 | 3 |
| Example 390 | Example 140 | 0 | 0 | 2 | 2 | 4 |

TABLE 67

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 391 | Example 141 | 0 | 1 | 1 | 3 | 4 |
| Example 392 | Example 142 | 0 | 1 | 1 | 1 | 3 |
| Example 393 | Example 143 | 0 | 0 | 1 | 1 | 2 |
| Example 394 | Example 144 | 0 | 0 | 1 | 1 | 1 |
| Example 395 | Example 145 | 0 | 0 | 1 | 2 | 4 |
| Example 396 | Example 146 | 0 | 0 | 2 | 2 | 4 |
| Example 397 | Example 147 | 0 | 1 | 1 | 2 | 3 |
| Example 398 | Example 148 | 0 | 0 | 2 | 2 | 3 |
| Example 399 | Example 149 | 0 | 1 | 1 | 3 | 4 |
| Example 400 | Example 150 | 0 | 1 | 2 | 3 | 5 |

TABLE 68

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 401 | Example 151 | 0 | 0 | 2 | 3 | 3 |
| Example 402 | Example 152 | 0 | 0 | 1 | 2 | 2 |
| Example 403 | Example 153 | 0 | 0 | 1 | 1 | 1 |

TABLE 68-continued

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 404 | Example 154 | 0 | 1 | 1 | 3 | 4 |
| Example 405 | Example 155 | 0 | 1 | 2 | 2 | 4 |
| Example 406 | Example 156 | 0 | 1 | 1 | 2 | 3 |
| Example 407 | Example 157 | 0 | 0 | 2 | 2 | 3 |
| Example 408 | Example 158 | 0 | 1 | 3 | 3 | 4 |
| Example 409 | Example 159 | 0 | 1 | 3 | 3 | 4 |
| Example 410 | Example 160 | 0 | 0 | 1 | 3 | 3 |

TABLE 69

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 411 | Example 161 | 0 | 0 | 1 | 2 | 2 |
| Example 412 | Example 162 | 0 | 0 | 1 | 1 | 1 |
| Example 413 | Example 163 | 0 | 4 | 5 | 8 | 8 |
| Example 414 | Example 164 | 0 | 3 | 4 | 7 | 7 |
| Example 415 | Example 165 | 0 | 2 | 4 | 7 | 9 |
| Example 416 | Example 166 | 0 | 4 | 6 | 9 | 13 |
| Example 417 | Example 167 | 0 | 5 | 5 | 7 | 10 |
| Example 418 | Example 168 | 0 | 2 | 4 | 7 | 9 |
| Example 419 | Example 169 | 0 | 4 | 6 | 9 | 13 |
| Example 420 | Example 170 | 0 | 5 | 5 | 7 | 10 |

TABLE 70

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 421 | Example 171 | 0 | 2 | 4 | 7 | 10 |
| Example 422 | Example 172 | 0 | 4 | 6 | 9 | 12 |
| Example 423 | Example 173 | 0 | 5 | 5 | 7 | 9 |
| Example 424 | Example 174 | 0 | 6 | 6 | 8 | 8 |
| Example 425 | Example 175 | 0 | 1 | 1 | 2 | 4 |
| Example 426 | Example 176 | 0 | 1 | 3 | 3 | 4 |
| Example 427 | Example 177 | 0 | 0 | 1 | 2 | 2 |

TABLE 70-continued

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 428 | Example 178 | 0 | 0 | 0 | 2 | 4 |
| Example 429 | Example 179 | 0 | 1 | 1 | 2 | 4 |
| Example 430 | Example 180 | 0 | 1 | 2 | 3 | 5 |

TABLE 71

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 431 | Example 181 | 0 | 1 | 1 | 3 | 3 |
| Example 432 | Example 182 | 0 | 1 | 2 | 2 | 3 |
| Example 433 | Example 183 | 0 | 0 | 1 | 2 | 3 |
| Example 434 | Example 184 | 0 | 1 | 2 | 3 | 4 |
| Example 435 | Example 185 | 0 | 0 | 1 | 2 | 4 |
| Example 436 | Example 186 | 0 | 1 | 1 | 2 | 3 |
| Example 437 | Example 187 | 0 | 0 | 2 | 2 | 3 |
| Example 438 | Example 188 | 0 | 1 | 1 | 2 | 4 |
| Example 439 | Example 189 | 0 | 1 | 2 | 3 | 4 |
| Example 440 | Example 190 | 0 | 0 | 1 | 2 | 3 |

TABLE 72

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 441 | Example 191 | 0 | 1 | 1 | 2 | 4 |
| Example 442 | Example 192 | 0 | 0 | 3 | 3 | 4 |
| Example 443 | Example 193 | 0 | 1 | 1 | 2 | 3 |
| Example 444 | Example 194 | 0 | 1 | 1 | 2 | 2 |
| Example 445 | Example 195 | 0 | 1 | 1 | 1 | 2 |
| Example 446 | Example 196 | 0 | 1 | 2 | 2 | 4 |
| Example 447 | Example 197 | 0 | 1 | 1 | 2 | 4 |
| Example 448 | Example 198 | 0 | 1 | 2 | 3 | 3 |
| Example 449 | Example 199 | 0 | 1 | 1 | 2 | 3 |
| Example 450 | Example 200 | 0 | 1 | 2 | 2 | 3 |

TABLE 73

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 451 | Example 201 | 0 | 0 | 2 | 3 | 4 |
| Example 452 | Example 202 | 0 | 0 | 2 | 3 | 5 |
| Example 453 | Example 203 | 0 | 1 | 2 | 2 | 2 |
| Example 454 | Example 204 | 0 | 0 | 1 | 2 | 2 |
| Example 455 | Example 205 | 0 | 1 | 2 | 2 | 4 |
| Example 456 | Example 206 | 0 | 0 | 1 | 2 | 4 |
| Example 457 | Example 207 | 0 | 1 | 1 | 2 | 3 |
| Example 458 | Example 208 | 0 | 0 | 2 | 2 | 4 |
| Example 459 | Example 209 | 0 | 0 | 3 | 3 | 4 |
| Example 460 | Example 210 | 0 | 0 | 2 | 2 | 4 |

TABLE 74

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 461 | Example 211 | 0 | 0 | 1 | 1 | 2 |
| Example 462 | Example 212 | 0 | 0 | 1 | 1 | 1 |
| Example 463 | Example 213 | 0 | 0 | 0 | 1 | 2 |
| Example 464 | Example 214 | 0 | 0 | 1 | 1 | 1 |
| Example 465 | Example 215 | 0 | 0 | 0 | 1 | 1 |
| Example 466 | Example 216 | 0 | 0 | 1 | 1 | 1 |
| Example 467 | Example 217 | 0 | 0 | 0 | 1 | 1 |
| Example 468 | Example 218 | 0 | 0 | 0 | 1 | 1 |
| Example 469 | Example 219 | 0 | 0 | 0 | 0 | 1 |
| Example 470 | Example 220 | 0 | 0 | 0 | 1 | 1 |

TABLE 75

| Antifouling coating composition | Coating composition | Antifouling properties (number of barnacles attached) | | | | |
|---|---|---|---|---|---|---|
| | | 0 month | 3 months | 6 months | 9 months | 12 months |
| Example 471 | Example 221 | 0 | 0 | 0 | 1 | 1 |
| Example 472 | Example 222 | 0 | 0 | 0 | 0 | 0 |
| Example 473 | Example 223 | 0 | 0 | 0 | 0 | 1 |

TABLE 75-continued

| Anti-fouling coating composition | Coating composition | Antifouling properties (number of barnacles attached) | | | | |
|---|---|---|---|---|---|---|
| | | 0 month | 3 months | 6 months | 9 months | 12 months |
| Example 474 | Example 224 | 0 | 0 | 0 | 0 | 0 |
| Example 475 | Example 225 | 0 | 0 | 0 | 0 | 1 |
| Example 476 | Example 226 | 0 | 0 | 0 | 0 | 1 |
| Example 477 | Example 227 | 0 | 0 | 0 | 0 | 0 |
| Example 478 | Example 228 | 0 | 0 | 0 | 0 | 1 |
| Example 479 | Example 229 | 0 | 0 | 0 | 0 | 0 |
| Example 480 | Example 230 | 0 | 0 | 0 | 0 | 0 |

TABLE 76

| Anti-fouling coating composition | Coating composition | Antifouling properties (number of barnacles attached) | | | | |
|---|---|---|---|---|---|---|
| | | 0 month | 3 months | 6 months | 9 months | 12 months |
| Example 481 | Example 231 | 0 | 1 | 1 | 2 | 2 |
| Example 482 | Example 232 | 0 | 1 | 1 | 2 | 3 |
| Example 483 | Example 233 | 0 | 0 | 1 | 1 | 2 |
| Example 484 | Example 234 | 0 | 0 | 1 | 1 | 3 |
| Example 485 | Example 235 | 0 | 1 | 2 | 2 | 3 |
| Example 486 | Example 236 | 0 | 1 | 2 | 3 | 3 |
| Example 487 | Example 237 | 0 | 1 | 1 | 1 | 2 |
| Example 488 | Example 238 | 0 | 1 | 1 | 2 | 3 |
| Example 489 | Example 239 | 0 | 1 | 2 | 3 | 3 |
| Example 490 | Example 240 | 0 | 1 | 2 | 3 | 3 |

TABLE 77

| Anti-fouling coating composition | Coating composition | Antifouling properties (number of barnacles attached) | | | | |
|---|---|---|---|---|---|---|
| | | 0 month | 3 months | 6 months | 9 months | 12 months |
| Example 491 | Example 241 | 0 | 1 | 1 | 2 | 2 |
| Example 492 | Example 242 | 0 | 1 | 2 | 2 | 3 |
| Example 493 | Example 243 | 0 | 0 | 2 | 2 | 4 |
| Example 494 | Example 244 | 0 | 0 | 3 | 3 | 4 |
| Example 495 | Example 245 | 0 | 0 | 1 | 2 | 4 |
| Example 496 | Example 246 | 0 | 0 | 0 | 1 | 1 |
| Example 497 | Example 247 | 0 | 0 | 1 | 1 | 1 |

TABLE 77-continued

| Anti-fouling coating composition | Coating composition | Antifouling properties (number of barnacles attached) | | | | |
|---|---|---|---|---|---|---|
| | | 0 month | 3 months | 6 months | 9 months | 12 months |
| Example 498 | Example 248 | 0 | 0 | 0 | 1 | 1 |
| Example 499 | Example 249 | 0 | 0 | 0 | 0 | 1 |
| Example 500 | Example 250 | 0 | 0 | 0 | 1 | 1 |

TABLE 78

| Anti-fouling coating composition | Coating varnish | Antifouling properties (number of barnacles attached) | | | | |
|---|---|---|---|---|---|---|
| | | 0 month | 3 months | 6 months | 9 months | 12 months |
| Comp. Example 8 | Production Example 11 | 0 | 32 | 35 | 78 | 123 |
| Comp. Example 9 | Production Example 12 | 0 | 34 | 46 | 75 | 143 |

As is apparent from the above test results, the antifouling coating compositions using the coating compositions of the present invention (Examples 251–500) showed excellent antifouling properties and had only slight attachment of organisms as compared with the antifouling coating compositions using the varnish disclosed in WO 84/02915 (Comparative Examples 8 and 9).

The coating varnish composition and the antifouling coating composition of the present invention have no danger such as caused by the organotin copolymers and are capable of forming an excellent coating which does not gel even when a copper compound is incorporated. Further, they can maintain excellent ability to form coating eroded gradually during usage in the seawater and antifouling properties for a long period of time.

What is claimed is:

1. An antifouling coating composition comprising (A) a polymer obtained by polymerizing (a1) one or more unsaturated acid anhydrides or unsaturated carboxylic acids and (a2) one or more other unsaturated monomers copolymerizable with the component (a1), (B) at least one compound selected from the group consisting of compounds having both hydrophobic and hydrophilic groups in the molecule, (C) at least one compound selected from the group consisting of a benzotriazole unsubstituted or substituted with a member selected from the group consisting of alkyl, aryl, halogen, nitro, alkoxy, and alkylamino and a triazole unsubstituted or substituted with a member selected from the group consisting of alkyl, aryl, aralkyl, halogen, amino, and hydroxy, and (D) an antifouling agent.

2. An antifouling coating composition comprising (A) a polymer obtained by polymerizing (a1) one or more unsaturated acid anhydrides or unsaturated carboxylic acids and (a2) one or more other unsaturated monomers copolymerizable with the component (a1), (B) at least one compound selected from the group consisting of compounds having both hydrophobic and hydrophilic groups in the molecule, (C) at least one benzotriazole compound selected from the group consisting of 1,2,3-benzotriazole, 1-methyl-1,2,3-benzotriazole, 1-phenyl-1,2,3-benzotriazole, 2-phenyl-1,2,3-benzotriazole, 4-chloro-1,2,3-benzotriazole, 4-nitro-1,2,3-benzotriazole, 5-methyl-1,2,3-benzotriazole, 5-ethyl-1,2,3-benzotriazole, 5-propyl-1,2,3-benzotriazole, 5-isobutyl-1,2,3-benzotriazole, 5-methoxy-1,2,3-benzotriazole, 5-chloro-1,2,3-benzotriazole, 5,6-dimethyl-1,2,3-benzotriazole, 1,2,3-benzotriazole carboxylic acid, an ester of said acid, and N-dialkylaminomethyl-1,2,3-benzotriazole.

3. An antifouling coating composition comprising (A) a polymer obtained by polymerizing (a1) one or more unsaturated acid anhydrides or unsaturated carboxylic acids and (a2) one or more other unsaturated monomers copolymerizable with the component (a1), (B) at least one compound selected from the group consisting of compounds having both hydrophobic and hydrophilic groups in the molecule, (C) at least one amino-substituted triazole selected from the group consisting of 4-amino-1,2,4-triazole and 3-amino-1H-1,2,3-benzotriazole.

4. An antifouling coating composition comprising (A) a polymer obtained by polymerizing (a1) one or more unsaturated acid anhydrides or unsaturated carboxylic acids and (a2) one or more other unsaturated monomers copolymerizable with the component (a1), (B) at least one compound selected from the group consisting of compounds having both hydrophobic and hydrophilic groups in the molecule, (C) at least one triazole selected from the group consisting of 1,2,3-triazole, 1-methyl-1,2,3-triazole, 1-phenyl-1,2,3-triazole, 1-benzyl-1,2,3-triazole, 2-methyl-1,2,3-triazole, 2-phenyl-1,2,3-triazole, 2-benzyl-1,2,3-triazole, 4-methyl-1,2,3-triazole, 4-phenyl-1,2,3-triazole, 4-hydroxy-1,2,3-triazole, 4,5-dimethyl-1,2,3-triazole, 4-methyl-2-phenyl-1,2,3-triazole, 4,5-dimethyl-2-phenyl-1,2,3-triazole, 1,5-diphenyl-1,2,3-triazole, 1,2,4-triazole, 1-methyl-1,2,4-triazole, 1-phenyl-1,2,4-triazole, 3-methyl-1,2,4-triazole, 3-phenyl-1,2,4-triazole, 3-chloro-1,2,4-triazole, 3-bromo-1,2,4-triazole, 3,5-dimethyl-1,2,4-triazole, 3,5-diethyl-1,2,4-triazole, 1,3-diphenyl-1,2,4-triazole, 1,5-diphenyl-1,2,4-triazole and 3,5-diphenyl-1,2,4-triazole.

5. A composition according to claim 1, wherein the unsaturated monomer (a2) is at least one unsaturated monomer selected from monomers including those represented by the formula:

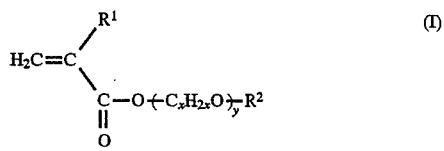

wherein $R^1$ is a hydrogen atom or a methyl group; x is an integer of 1 to 6; y is an integer of 1 to 10; and $R^2$ is a hydrogen atom, a straight, branched or cyclic alkyl having 1 to 10 carbon atoms, an aryl group having 6 to 10 carbon atoms, or an aralkyl group having 7 to 10 carbon atoms, provided that when an unsaturated acid anhydride is used as the component (a1) of the polymer (A), $R^2$ is not a hydrogen atom.

6. A composition according to claim 1, wherein the compound having both hydrophobic and hydrophilic groups in the molecule is a compound having one hydrophilic group bonded to one or more hydrocarbon groups which may have one or more substituents and having, as the hydrophobic group, a $C_{4-30}$ straight, branched or cyclic alkyl group, an aryl group or an aralkyl group, or a $C_{4-30}$ hydrocarbon group, said hydrophobic group able to have one or more substituents and forms a cyclic structure with a hydrophilic group interposed therebetween, said compound having a melting point of 0° C. or above, and said substituents being selected from the group consisting of halogen atoms and silicon atom.

7. A composition according to claim 1, wherein the compound having both hydrophobic and hydrophilic groups in the molecule has, as the hydrophilic group, a group of the formula:

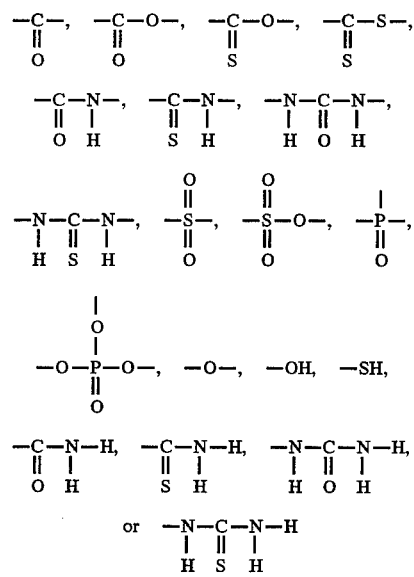

and, as the hydrophobic group, a group selected from the group consisting of butyl, isobutyl, sec-butyl, tert-butyl, pentyl, sec-pentyl, tert-pentyl, neopentyl, hexyl, heptyl, octyl, 2-ethyl-hexyl, nonyl, decyl, undecyl, dodecyl, tridecyl, tetradecyl, pentadecyl, hexadecyl, heptadecyl, octadecyl, nonadecyl, eicosyl, cyclopropyl, cyclobutyl, cyclopentyl, cyclohexyl, phenyl, o-tolyl, m-tolyl, p-tolyl, 2,3-xylyl, 2,4-xylyl, o-cumenyl, m-cumenyl, p-cumenyl, mesityl, benzyl, phenetyl, naphthyl, norbornyl, tetramethylene, pentamethylene, hexamethylene and octamethylene.

8. A composition according to claim 1, wherein the amount of the component (B) is 0.01–200% by weight based on the weight of the polymer (A).

9. A composition according to claim 1, wherein the compound having both hydrophobic and hydrophilic groups in the molecule is at least one compound selected from the group consisting of triphenyl phosphate and ethyl stearate.

10. An antifouling coating composition according to claim 1, wherein the amount of the antifouling agent is 1–500% by weight based on the whole weight of the polymer.

* * * * *